(12) United States Patent
Aoki

(10) Patent No.: US 10,857,660 B2
(45) Date of Patent: Dec. 8, 2020

(54) POWER TOOL

(71) Applicant: MAKITA CORPORATION, Anjo (JP)

(72) Inventor: Yonosuke Aoki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 133 days.

(21) Appl. No.: 16/193,860

(22) Filed: Nov. 16, 2018

(65) Prior Publication Data

US 2019/0168372 A1 Jun. 6, 2019

(30) Foreign Application Priority Data

Dec. 1, 2017 (JP) ................ 2017-232068

(51) Int. Cl.
| | | |
|---|---|---|
| *B25F 5/00* | (2006.01) | |
| *B24B 23/04* | (2006.01) | |
| *B25F 3/00* | (2006.01) | |
| *B27B 19/00* | (2006.01) | |
| *B23D 51/02* | (2006.01) | |
| *B25F 5/02* | (2006.01) | |
| *B23D 61/00* | (2006.01) | |

(52) U.S. Cl.
CPC .............. *B25F 5/006* (2013.01); *B23D 51/02* (2013.01); *B24B 23/04* (2013.01); *B25F 3/00* (2013.01); *B25F 5/02* (2013.01); *B27B 19/006* (2013.01); *B23D 61/006* (2013.01)

(58) Field of Classification Search
CPC ...... B23D 61/006; B23D 51/02; B24B 23/04; B27B 19/006; B25F 5/006; B25F 5/02; B25F 3/00
See application file for complete search history.

(56) References Cited

U.S. PATENT DOCUMENTS

| | | | | |
|---|---|---|---|---|
| 4,543,718 A * | 10/1985 | Duescher | ................ | A61F 15/02 30/124 |
| 5,435,066 A * | 7/1995 | Bare | ................ | A61F 15/02 30/388 |
| 7,104,873 B1 * | 9/2006 | Borinato | ................ | B24B 23/03 451/121 |
| 8,182,316 B2 * | 5/2012 | Peisert | ................ | B23Q 5/027 30/388 |
| 2012/0192438 A1 * | 8/2012 | Aoki | ................ | B23D 51/16 30/392 |

(Continued)

*Primary Examiner* — Andrew M Tecco
*Assistant Examiner* — Nicholas E Igbokwe
(74) *Attorney, Agent, or Firm* — Oliff PLC

(57) ABSTRACT

A power tool includes a motor having an output shaft rotatable around a first axis, a spindle rotatably supported around a second axis, a transmitting mechanism configured to reciprocally rotate the spindle within a specified angle range around the second axis, an elongate support body supporting the motor, the spindle and the transmitting mechanism, an elongate housing that houses the support body, and a first elastic member interposed between the housing and a first end part of the support body and connecting the housing and the support body so as to be movable relative to each other. The spindle is supported in the first end part such that the second axis crosses the direction of a longitudinal axis of the support body. The support body has a weight provided to increase an inertia moment of the support body around the second axis.

12 Claims, 23 Drawing Sheets

(56) References Cited

U.S. PATENT DOCUMENTS

| | | | |
|---|---|---|---|
| 2013/0000937 A1* | 1/2013 | Onoda | B25D 17/24 |
| | | | 173/122 |
| 2013/0048327 A1* | 2/2013 | Machida | B25D 11/062 |
| | | | 173/162.2 |
| 2015/0034347 A1 | 2/2015 | Hess et al. | |
| 2015/0217422 A1* | 8/2015 | Esenwein | B24B 23/04 |
| | | | 173/217 |
| 2016/0221175 A1* | 8/2016 | Aoki | B24B 23/04 |

* cited by examiner

POWER TOOL

CROSS-REFERENCE TO RELATED APPLICATION

The present application claims priority to Japanese patent application No. 2017-232068 filed on Dec. 1, 2017, the contents of which are fully incorporated herein by reference.

TECHNICAL FIELD

The present disclosure relates to a power tool which is configured to perform a processing operation on a workpiece by oscillatory driving a tool accessory.

BACKGROUND ART

A power tool (so-called oscillating tool) is known which performs a processing operation on a workpiece by transmitting an output of a motor to a spindle and oscillating (reciprocally rotating) a tool accessory mounted to a lower end of the spindle within a specified angle range. As for such a power tool, various structures have been proposed to improve operability. For example, U.S. Patent Application Publication No. 2015/0034347 discloses that an outer housing and a driving element, which includes a motor and a spindle, are connected to each other via elastic members in order to suppress transmission of vibration to the outer housing held by a user.

SUMMARY

In the above-described power tool, the driving element is allowed to move relative to the housing to some extent. Therefore, when a certain load is applied to the tool accessory, the driving element may oscillate within the housing held by the user, around the tool accessory serving as a fulcrum. In such a case, a stroke (an oscillating range) of the tool accessory may become shorter than its original stroke, so that the working efficiency of the tool accessory may decrease.

Accordingly, it is an object of the present disclosure to provide a technology which may help suppress a decrease in working efficiency of a tool accessory in a power tool which oscillatory drives the tool accessory.

According to one aspect of the disclosure, a power tool is provided which is configured to oscillatory drive a tool accessory. The power tool includes a motor, a spindle, a transmitting mechanism, a support body, a housing and a first elastic member.

The motor has an output shaft which is rotatable around a first axis. The spindle is configured to removably receive the tool accessory, and is rotatably supported around a second axis. The transmitting mechanism is configured to transmit rotation of the output shaft to the spindle and reciprocally rotate the spindle within a specified angle range around the second axis. The support body has an elongate shape having a longitudinal axis, and supports the motor, the spindle and the transmitting mechanism. The housing has an elongate shape and houses the support body. The first elastic member is interposed between the housing and a first end part of the support body and connects the housing and the support body so as to be movable relative to each other. The first end part forms an end part of the support body in a direction of the longitudinal axis. Further, the spindle is supported in the first end part such that the second axis crosses the direction of the longitudinal axis. The support body has a weight provided to increase an inertia moment of the support body around the second axis.

The power tool according to the present aspect is a so-called oscillating tool configured to oscillatory drive the tool accessory mounted to the spindle. In such a power tool, when the tool accessory is oscillatory driven, relatively large vibration is caused in the support body which supports the spindle. In the power tool according to the present aspect, the first end part of the support body which supports the spindle is connected with the housing via the first elastic member, so as to be movable relative to each other. Therefore, transmission of the vibration from the support body to the housing can be effectively suppressed. Further, the spindle, to which the tool accessory is mounted, is supported by the first end part of the support body having an elongate shape. To cope with this, the support body is provided with the weight to increase the inertia moment around the second axis. Such a structure makes the support body to be less likely to oscillate around the second axis even when a certain load is applied to the tool accessory. Therefore, during the processing operation, an unnecessary movement of the support body relative to the housing can be suppressed, so that a decrease in working efficiency of the tool accessory can be suppressed.

In the present aspect, the motor may be an alternate current (AC) motor or a direct current (DC) motor. Further, the motor may be a motor with a brush or a so-called brushless motor without having a brush. The motor may be supported such that the first axis extends in parallel to or extends to cross the longitudinal axis of the support body.

The manner that the support body "supports the motor, the spindle and the transmitting mechanism" may typically include the manner that the support body houses at least a portion of the motor, the spindle and the transmitting mechanism. In other words, the support body may be an inner housing which is disposed within the housing and at least partly houses the motor, the spindle and the transmitting mechanism. The support body may be a single member, or an integrated unit formed by connecting a plurality of members. The housing that houses the support body may also be a single member, or an integrated unit formed by connecting a plurality of members.

The housing and the first end part of the support body may be connected only via the first elastic member, or via the first elastic member and another member. The first elastic member may be formed of, for example, synthetic resin having elasticity, a rubber element, or a spring element. In order to effectively suppress the transmission of the vibration, it may be preferable that the first elastic member connects the first end part of the support body and a region of the housing which houses the first end part. It may be more preferable that the support body is connected with the housing via the first elastic member so as to be movable in all directions (in front-rear, left-right and up-down directions of the power tool) relative to the housing. Further, the number of the first elastic member is not particularly limited, but it may be more preferable to provide a plurality of first elastic members.

The weight provided to increase the inertia moment of the support body around the second axis may be formed separately from the support body and fixed (substantially immovably connected) to the support body, or formed by a portion of the support body. It may be preferable that the weight is made of a material having a relatively high density (having a relatively large mass per unit volume). Examples of such a material may include a metal such as aluminum, zinc, iron, and an alloy containing any one of them, when the support body is made of plastic. Further, it may be preferable that the weight is disposed at a position as distant as possible from the second axis, in order to further increase the inertia moment.

In one aspect of the present disclosure, the support body may include a weight-mounting part to which the weight is mounted, and the weight may be made of a material having a higher density than at least the weight-mounting part. In terms of reduction in weight and manufacturing costs of the whole power tool, it may be preferable that the support body is made of a material having a relatively low density. In this case, however, the inertia moment of the support body becomes liable to decrease. According to the present aspect, however, the inertia moment of the support body can be appropriately increased with a simple structure that the weight having a higher density than the weight-mounting part is provided to the support body.

In one aspect of the present disclosure, the housing may include a grip part configured to be held by a user. The support body may include an extending part which is integrally formed with the first end part and which extends from the first end part in the direction of the longitudinal axis of the support body, corresponding to at least a portion of the grip part. The manner that the extending part is "integrally formed with the first end part" here may include not only the manner that the first end part and the extending part are integrally formed as a single member, but also the manner that the extending part is formed separately from the first end part and substantially immovably connected to the first end part. Further, the weight may be provided to the extending part. According to the present aspect, the weight is provided to the extending part of the support body, that is, disposed at a position more distant from the second axis than the first end part, so that the inertia moment can be effectively increased. It may be more preferable that the weight is disposed in an end part of the extending part on the opposite side to the first end part in the direction of the longitudinal axis of the support body, that is, in the most distant region from the second axis in the extending part.

In one aspect of the present disclosure, the second axis of the spindle may be orthogonal to the direction of the longitudinal axis of the support body. When an extending direction of the second axis is defined as an up-down direction, the direction of the longitudinal axis of the support body is defined as a front-rear direction, and a direction orthogonal to the front-rear direction and the up-down direction is defined as a left-right direction, at least the extending part may include a left part and a right part which are connected together to form the extending part. The weight may be fixed to the extending part in a state in which the weight is held between the left part and the right part. According to the present aspect, the weight can be easily and reliably fixed to the extending part in the process of assembling the extending part.

In one aspect of the present disclosure, the support body may include a second end part and a plurality of second elastic members. The second end part may form another end part on an opposite side to the first end part in the direction of the longitudinal axis of the support body. The plurality of second elastic members may be spaced apart from each other in a circumferential direction around the longitudinal axis, and connect the extending part and the second end part so as to be movable relative to each other. The second end part may have a power-source-related device which is configured to enable power supply from a power source to the motor. Further, at least a portion of the weight may be disposed within an internal space surrounded by the plurality of second elastic members.

According to the present aspect, the spindle is disposed in the first end part of the support body, while the power-source-related device for enabling the power supply from the power source to the motor is disposed in the second end part, which is on the opposite side to the first end part in the direction of the longitudinal axis of the support body. Disposing the power-source-related device in the second end part can increase a mass on the second end part side in the direction of the longitudinal axis of the support body. Specifically, when a battery is employed as the power source, typically, a battery-mounting part to which a battery can be removably mounted may be provided as the power-source-related device. In this case, when the battery having a relatively large mass is mounted to the battery-mounting part in the second end part, the inertia moment of the support body can be further increased. Further, when an external AC power source is employed as the power source, typically, a converter for converting alternating current into direct current may be provided as the power-source-related device. In this case, the converter having a relatively large mass is disposed in the second end part, so that the inertia moment of the support body can also be further increased.

Further, in the present aspect, the second elastic members which connect the extending part and the second end part can suppress transmission of the vibration from the first end part to the second end part and thereby protect the power-source-related device. Like the first elastic member, the second elastic members may be formed of, for example, a synthetic resin having elasticity, a rubber element, or a spring element. The second elastic members may be imparted with elasticity by being shaped to be flexible. Further, according to the present aspect, the weight can be effectively arranged by effectively utilizing the internal space surrounded by the second elastic members.

In one aspect of the present disclosure, the first axis of the output shaft of the motor and the second axis of the spindle may extend in parallel to each other. The motor and the transmitting mechanism may be supported by the first end part of the support body. According to the present aspect, the motor and the spindle are both supported by the first end part of the support such that the output shaft of the motor and the spindle extend in parallel to each other. With this structure, the power tool can be reduced in size. Further, the weight can appropriately compensate for the reduction in the inertia moment which might otherwise be caused due to the structure that relatively heavy members of the power tool such as the motor, the spindle and the transmitting mechanism are all disposed in the first end part.

In one aspect of the present disclosure, a power tool is provided which is configured to oscillatory drive one of plural kinds of tool accessories selectively mounted thereto. The power tool includes a brushless motor, a spindle, a transmitting mechanism, a support body, a housing and an elastic member.

The brushless motor has an output shaft which is rotatable around a first axis. The spindle is configured to removably receive a tool accessory, and is rotatably supported around a second axis. The second axis extends in parallel to the first axis. The transmitting mechanism is configured to transmit rotation of the output shaft to the spindle and reciprocally rotate the spindle within a specified angle range around the second axis. The support body has an elongate shape having a longitudinal axis, and supports the brushless motor, the spindle and the transmitting mechanism. The housing has an elongate shape and houses the support body. The elastic member is interposed between the housing and a first end part of the support body, and connects the housing and the support body so as to be movable relative to each other. The first end part forms an end part of the support body in a direction of the longitudinal axis of the support body. Further, the brushless motor, the spindle and the transmitting mechanism are supported in the first end part such that the first axis and the second axis cross the direction of the longitudinal axis of the support body. An inertia moment of the support body around the second axis, the support body supporting the brushless motor, the spindle and the transmitting mechanism, is at least 20 times of an inertia moment of a tool accessory around the second axis, when the tool accessory having a largest mass among the plural kinds of the tool accessories is mounted to the spindle. It may be more preferable that the inertia moment of the support body around the second axis is not less than 25 times and not more than 35 times of the inertia moment of the tool accessory around the second axis.

The power tool according to the present aspect is a so-called oscillating tool configured to oscillatory drive the tool accessory mounted to the spindle. In such a power tool, when the tool accessory is oscillatory driven, relatively large vibration is caused in the support body which supports the spindle. In the power tool according to the present aspect, the first end part of the support body which supports the spindle is connected with the housing via the elastic member, so as to be movable relative to each other. Therefore, transmission of the vibration from the support body to the housing can be effectively suppressed. Further, the brushless motor, the spindle and the transmitting mechanism are all disposed in the first end part of the support body having an elongate shape, so that the power tool can be reduced in size.

Further, according to the present aspect, the inertia moment of the support body around the second axis is set to be at least 20 times or more preferably at least 25 times of the inertia moment of the tool accessory around the second axis, so that the support body can be made much harder to rotate around the second axis than the tool accessory. Thus, the inertia moment of the support body can be optimized in relation with the tool accessory. Therefore, the support is less likely to oscillate around the second axis even when a certain load is applied to the tool accessory. With such a structure, during the processing operation, an unnecessary movement of the support body relative to the housing can be suppressed, so that a decrease in working efficiency of the tool accessory can be suppressed. Furthermore, by setting the inertia moment of the support body around the second axis to be not more than 35 times of the inertia moment of the tool accessory around the second axis, the mass of the whole power tool can be set within a range in which the operability is not impaired while the inertia moment of the support body is optimized.

DETAILED DESCRIPTION OF THE EMBODIMENTS

Figure 1:
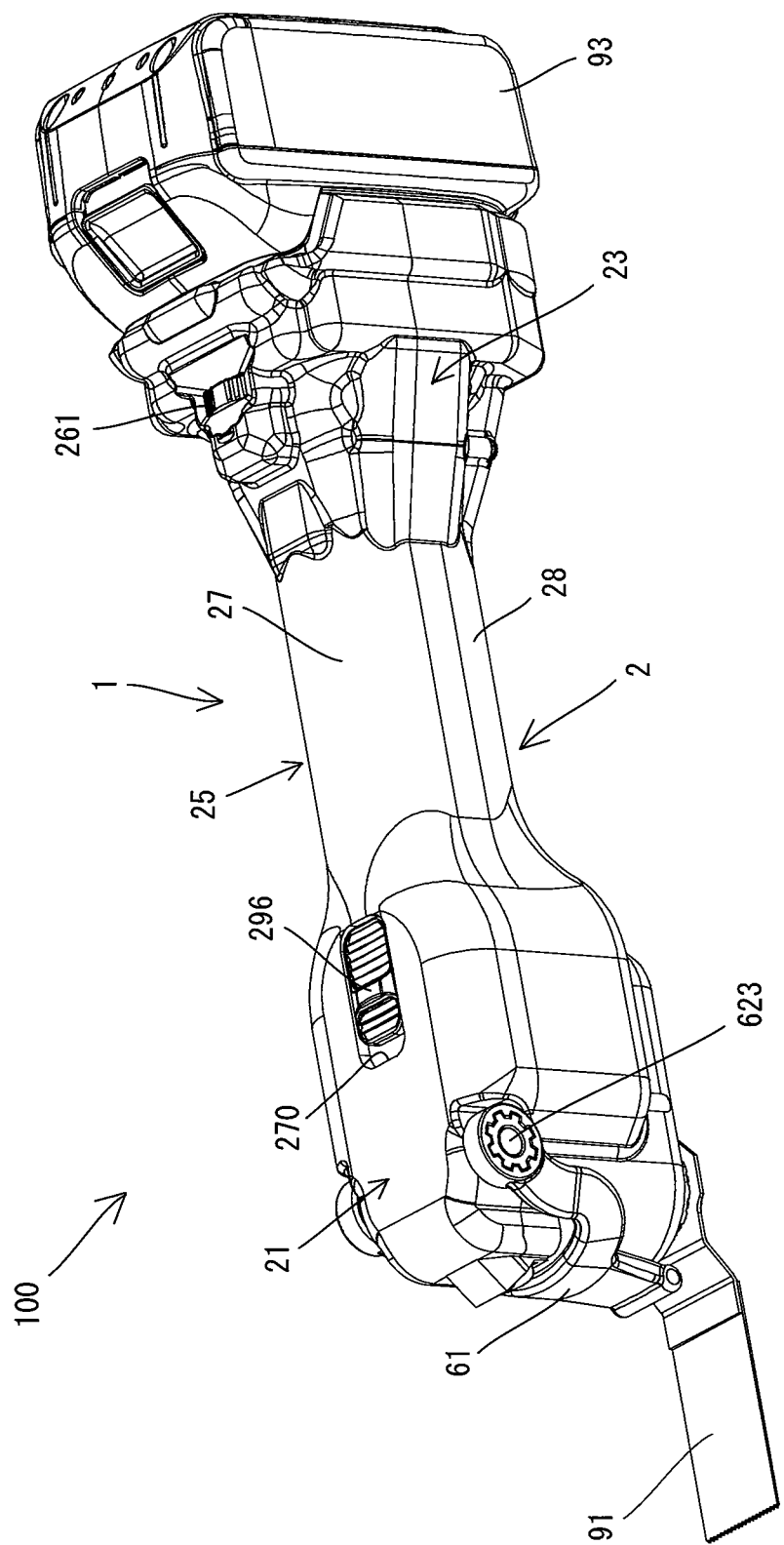
FIG. 1 is a perspective view showing an oscillating tool according to a first embodiment.

Embodiments are now explained with reference to the drawings.

First Embodiment

A first embodiment is now explained with reference to FIGS. 1 to 22. In the present embodiment, an electric oscillating tool 100 is described as an example which performs a processing operation on a workpiece (not shown) by oscillatory driving a tool accessory 91 (see FIG. 1). Plural kinds of tool accessories 91 such as a blade, a scraper, a grinding pad and a polishing pad which can be mounted to the oscillating tool 100 are available for the oscillating tool 100. In order to perform a desired operation such as cutting, scraping, grinding and polishing, a user may select one of the tool accessories 91 which is suitable for the desired operation and mount the tool accessory 91 to the oscillating tool 100. In the drawings referenced below, a blade mounted to the oscillating tool 100 is shown as an example of the tool accessory 91.

Figure 2:
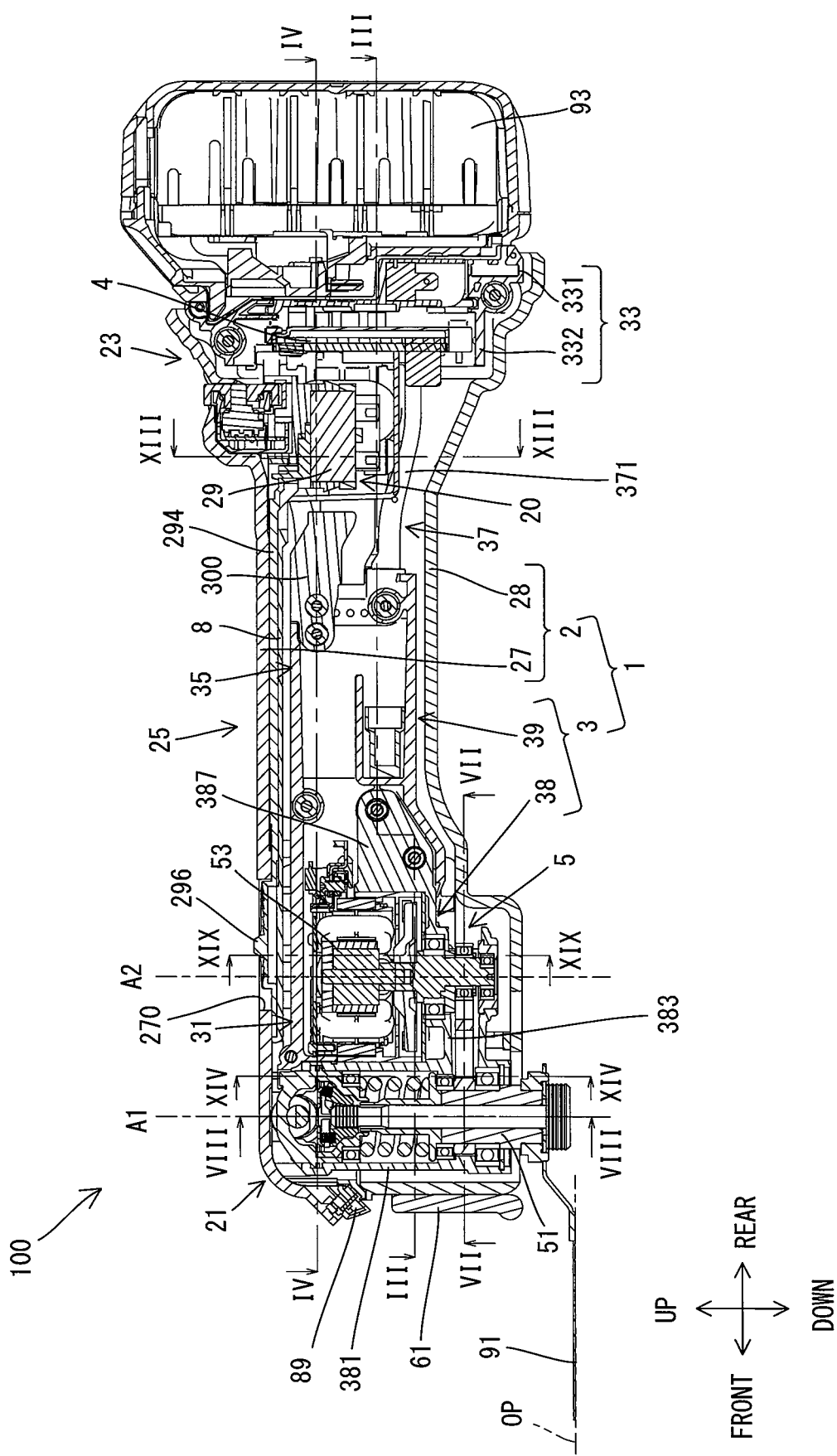
FIG. 2 is a longitudinal section view of the oscillating tool.

First, the general structure of the oscillating tool 100 is explained. As shown in FIGS. 1 and 2, the oscillating tool 100 includes an elongate housing 1. In the present embodiment, the housing 1 is configured as a so-called vibration-isolating housing having a two-layer structure. The housing 1 includes an elongate outer housing 2 which forms an outer shell of the oscillating tool 100 and an elongate inner housing 3 which is housed in the outer housing 2.

As shown in FIG. 2, a spindle 51 and a motor 53 are housed in one end portion in a direction of a longitudinal axis (a longitudinal-axis direction) of the housing 1. The spindle 51 is arranged such that its axis A1 extends to cross (specifically, to be generally orthogonal to) the longitudinal axis of the housing 1. One end portion of the spindle 51 in an extending direction of the axis A1 protrudes from the housing 1 and is exposed to the outside. The tool accessory 91 can be removably mounted to this exposed portion. Further, a battery 93 for supplying electric power to the motor 53 and an illumination unit 89 can be removably mounted to the other end portion of the housing 1 in the longitudinal-axis direction. The oscillating tool 100 is configured to reciprocally rotate the spindle 51 within a specified angle range around the axis A1 by power of the motor 53 and thereby oscillate the tool accessory 91 in an oscillation plane OP which is orthogonal to the axis A1.

In the following description, for convenience sake, relating to the directions of the oscillating tool 100, the extending direction of the axis A1 of the spindle 51 is defined as an up-down direction, and in the up-down direction, the side of the one end portion of the spindle 51 to which the tool accessory 91 can be mounted is defined as a lower side, while the opposite side is defined as an upper side. A direction which is orthogonal to the axis A1 and which corresponds to the longitudinal-axis direction of the housing 1 is defined as a front-rear direction, and in the front-rear direction, the side of the one end portion of the housing 1 in which the spindle 51 is housed is defined as a front side, while the side of the other end portion to which the battery 93 can be mounted is defined as a rear side. Further, a direction which is orthogonal to both the up-down direction and the front-rear direction is defined as a left-right direction. It is noted, when the blade shown in the drawings is mounted as the tool accessory 91, an oscillating direction of the tool accessory 91 generally corresponds to the left-right direction.

The structure of the oscillating tool 100 is now described in further detail. First, the outer housing 2 and the inner housing 3 which form the housing 1 are described.

As shown in FIGS. 1 to 4, in the present embodiment, the outer housing 2 is formed by connecting an upper shell 27, a lower shell 28 and a switch holder 20 which are formed separately from each other. Each of the upper shell 27, the lower shell 28 and the switch holder 20 is a member integrally molded and made of synthetic resin. In order to form the outer housing 2, the upper shell 27 and the lower shell 28 are placed against each other, with the switch holder 20 disposed therebetween in the up-down direction, and connected with screws at plural positions, which will be described in further detail later.

Further, in terms of the front-rear direction, the outer housing 2 includes a front-end part 21, a rear-end part 23, and a central part 25 connecting the front-end part 21 and the rear-end part 23.

The front-end part 21 has a generally rectangular box-like shape. A front-end part 31 (described later) of the inner housing 3 is disposed in the front-end part 21. A U-shaped operation lever 61 is supported on an upper front end portion of the front-end part 21 so as to be rotatable in the up-down direction. The operation lever 61 is configured to actuate a lock mechanism 6 (see FIG. 6), which will be described later. Further, an opening 270 is provided in a rear end portion (a boundary with a front end of the central part (or a grip part) 25 to be described later) of an upper wall of the front-end part 21 (the upper shell 27). The opening 270 is a through hole through which an operation part 296 is exposed to the outside so as to be slidable in the front-rear direction. The operation part 296 is configured to be manually operable by a user to turn the switch 29 on and off, which will be described in further detail later.

The rear-end part 23 has a cylindrical (tubular) shape enlarged (having a sectional area increasing) toward the rear. The rear-end part 23 includes the switch holder 20 fixed in the inside. The structure and arrangement of the switch holder 20 will be described later. Further, an elastic connection part 37 and a rear-end part 33 of the inner housing 3, which will be described later, are disposed within the rear-end part 23.

The central part 25 has a cylindrical (tubular) shape having a generally constant diameter. The central part 25 linearly extends in the front-rear direction. The central part 25 forms a grip part to be held by a user. For this reason, the central part 25 is formed thinner than the front-end part 21 and the rear-end part 23 so as to be easy to hold. The central part 25 is hereinafter also referred to as a grip part 25.

Next, the inner housing 3 is described. As shown in FIGS. 2 to 5, in the present embodiment, the inner housing 3 is formed by connecting a metal housing 38 and a plastic housing 39 which are formed separately from each other.

The metal housing 38 houses a driving mechanism 5, which will be described later. The metal housing 38 includes a spindle-housing part 381, a motor-housing part 383 and a contact part 387, all of which are integrally formed. The spindle-housing part 381 has a circular cylindrical shape which extends in the up-down direction. The motor-housing part 383 has a circular cylindrical shape having a larger diameter than the spindle-housing part 381 as a whole, and is disposed rearward of the spindle-housing part 381. The contact part 387 is a thick plate-like portion extending rearward from a rear end of the motor-housing part 383. The contact part 387 is disposed along a virtual vertical plane VP which includes a center line of the housing 1 in the left-right direction, such that the thickness direction of the plate-like contact part 387 crosses the vertical plane VP. The vertical plane VP can also be defined as a virtual plane including the axis A1 and an axis A2.

The plastic housing 39 is made of synthetic resin. The plastic housing 39 is formed by a left shell 391 and a right shell 392 which are separately formed. In the present embodiment, the left shell 391 and the right shell 392 are generally symmetrical (with respect to the vertical plane VP), except for their respective portions which are connected with each other with screws. The inner housing 3 is formed by connecting the left shell 391 and the right shell 392 with screws in a state in which a rear end portion of the metal housing 38 is held between the left shell 391 and the right shell 392 in the left-right direction, which will be described in further detail later.

Further, in terms of the front-rear direction, the inner housing 3 includes a front-end part 31, a rear-end part 33, an extending part 35 which extends rearward from a rear end of the front-end part 31, and an elastic connection part 37 which connects the extending part 35 and the rear-end part 33 so as to be movable relative to each other.

The front-end part 31 includes the metal housing 38 and a front end portion of the plastic housing 39. The front end portion of the plastic housing 39 is shaped to correspond to an upper end portion of the motor-housing part 383. The front end portion of the plastic housing 39 forms a motor-cover part 311 which covers an opening provided at the upper end of the motor-housing part 383.

The rear-end part 33 is a rear end portion of the plastic housing 39. The rear-end part 33 has a generally rectangular cylindrical shape. In the present embodiment, a rear portion of the rear-end part 33 forms a battery-mounting part 331. The battery-mounting part 331 has an engagement structure with which the battery 93 can be slidingly engaged and a terminal which is configured to be electrically connected to the battery 93. A front portion of the rear-end part 33 forms a control-unit-housing part 332 for housing a control unit 4.

The extending part 35 is a cylindrical (tubular) portion of the plastic housing 39 which extends rearward from a rear end of the motor-cover part 311. The extending part 35 is formed to have a larger up-down height than the motor-cover part 311. More specifically, the extending part 35 is formed to have an upper portion extending rearward contiguously from the motor-cover part 311 and a lower portion protruding downward below the motor-cover part 311. A front end of the lower portion of the extending part 35 is held in contact with an outer wall surface of the motor-housing part 383. The extending part 35 is a portion of the inner housing 3 that corresponds to at least a portion of the grip part 25 of the outer housing 2. It is noted here that the phrase "the extending part 35 is a portion of the inner housing 3 that corresponds to at least part a portion of the grip part 25" can be rephrased as "the extending part 35 is partially or entirely housed in at least a portion of the grip part 25". In the present embodiment, the extending part 35 is formed to have about the same length as the grip part 25 in the front-rear direction, and almost the whole extending part 35 is housed in the grip part 25.

The elastic connection part 37 is a portion of the plastic housing 39 which extends rearward from the extending part 35. The elastic connection part 37 includes a plurality of elastic ribs 371 which connect the extending part 35 and the rear-end part 33 in the front-rear direction. As described above, the inner housing 3 has the longitudinal axis which extends in the front-rear direction. The elastic ribs 371 are spaced apart from each other in a circumferential direction around the longitudinal axis of the inner housing 3. In other words, openings are defined between adjacent ones of the elastic ribs 371 and provide communication between an internal space 370 of the elastic connection part 37 and the outside. In the present embodiment, four such elastic ribs 371 are provided in total. Specifically, two elastic ribs 371 are provided on the left shell 391 and two elastic ribs 371 are provided on the right shell 392. The two elastic ribs 371 on each of the left shell 391 and the right shell 392 are spaced apart from each other in the up-down direction and extend such that the distance therebetween in the up-down direction slightly increases toward the rear. Further, the left and right elastic ribs 371 on the left and right shells 391, 392 extend such that the distance therebetween in the left-right direction increases toward the rear.

Each of the elastic ribs 371 has a curved band-like shape and is thereby imparted with flexibility. Thus, the elastic ribs 371 is elastically deformable. Further, in the present embodiment, the four elastic ribs 371 are made of a material having a lower elastic modulus than the other parts (the motor-cover part 311, the extending part 35 and the rear-end part 33) of the plastic housing 39. Specifically, the elastic ribs 371 are made of polyacetal containing no reinforcement fiber, while the other parts of the plastic housing 39 are made of glass-fiber-reinforced polyamide. However, the materials of the plastic housing 39 are not so limited. For example, when the other parts are made of glass-fiber-reinforced polyamide, the elastic ribs 371 may be made of polycarbonate or ABS resin (either containing no reinforcement fiber). Further, in the present embodiment, although only the elastic ribs 371 are made of a different material from the other parts of the left and right shells 391, 392, each of the left shell 391 and the right shell 392 is integrally molded as a whole. Thus, in the present embodiment, the elastic ribs 371 are shaped to be more easily elastically deformable than the other parts of the plastic housing 39 and also formed to have lower rigidity than the other parts by being made of a material having a lower elastic modulus.

A structure of connecting the metal housing 38 and the plastic housing 39 of the inner housing 3 is now briefly described.

Figure 3:
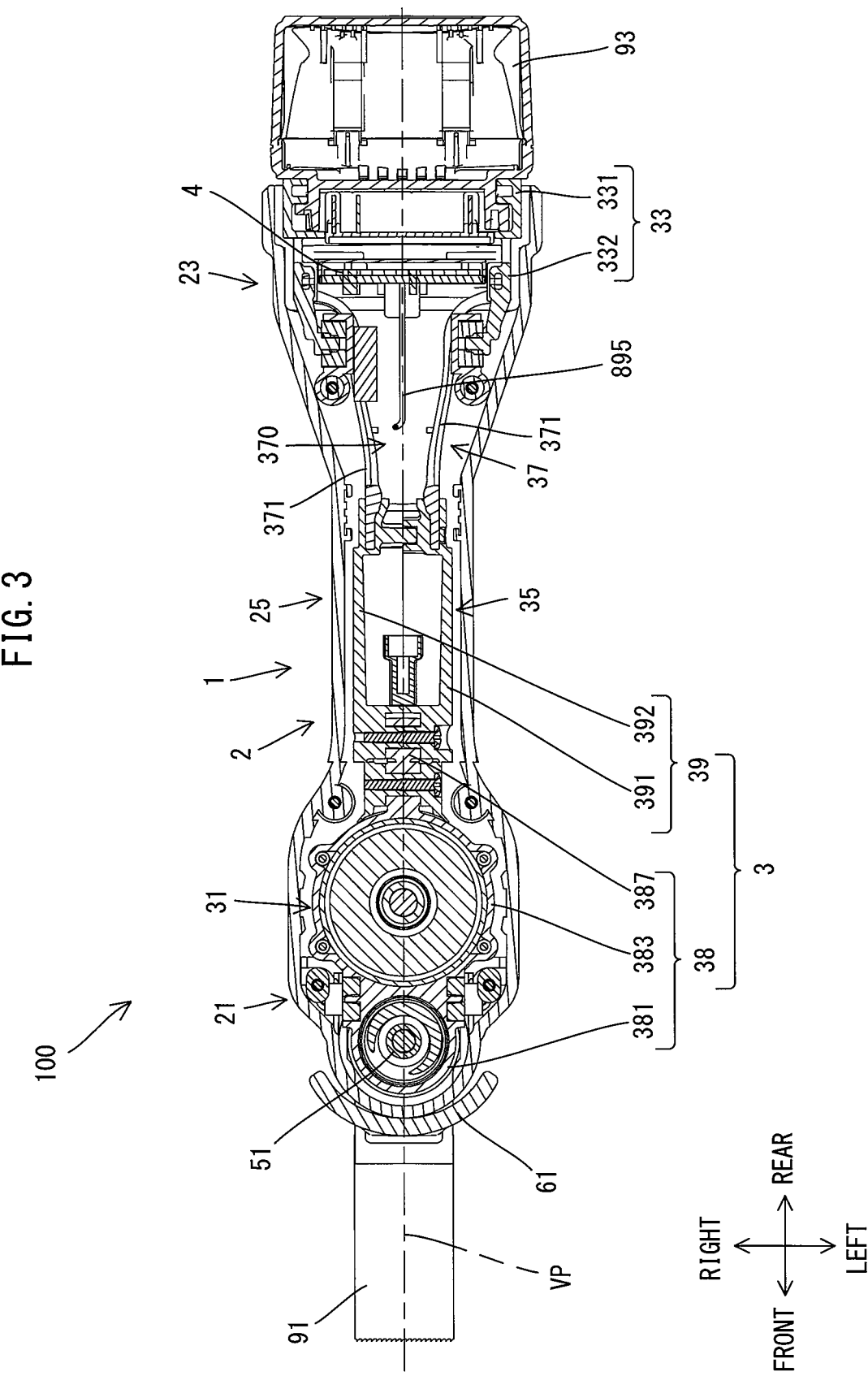
FIG. 3 is a sectional view taken along line III-III in FIG. 2.
Figure 4:
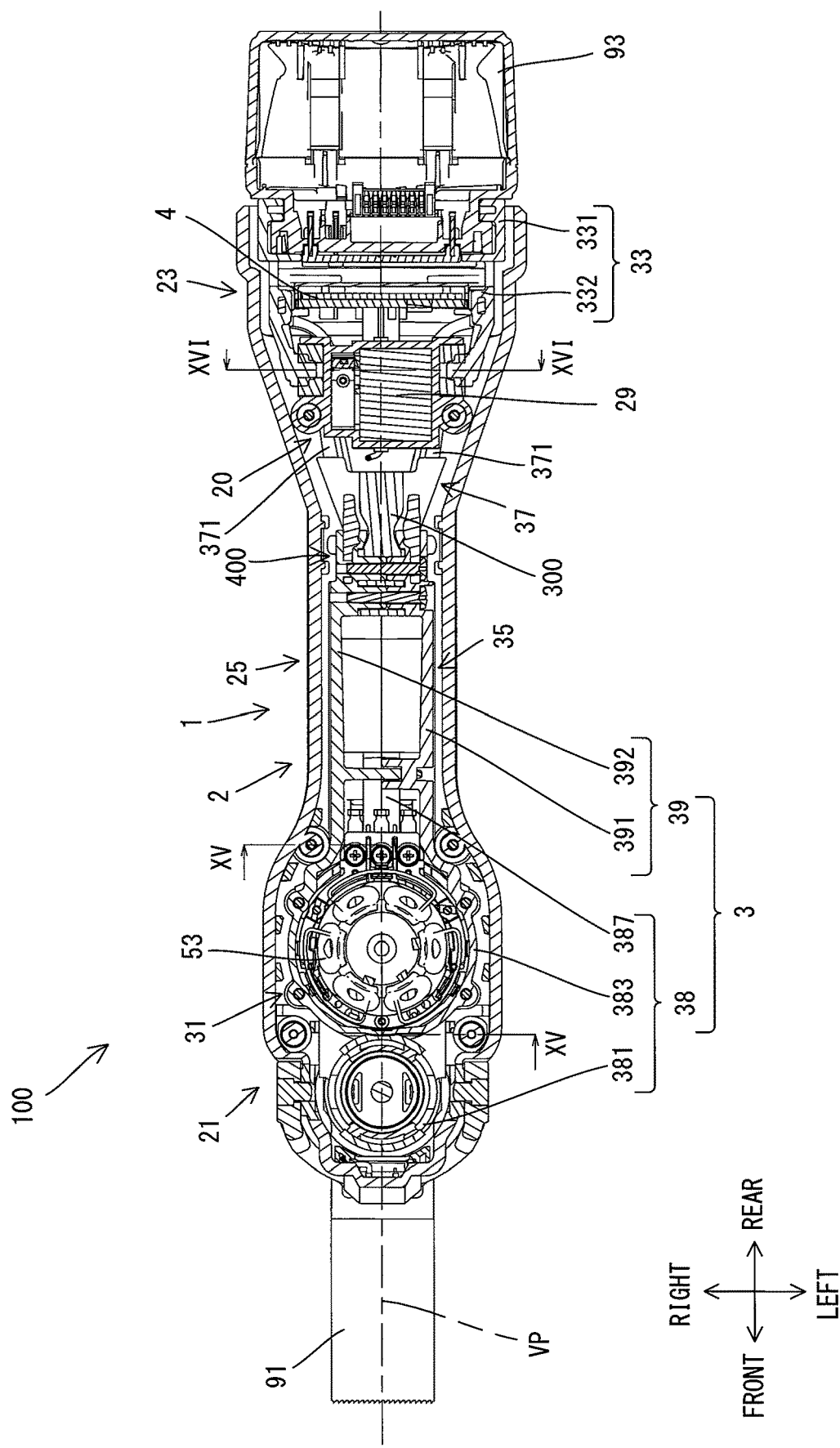
FIG. 4 is a sectional view taken along line IV-IV in FIG. 2.
Figure 5:
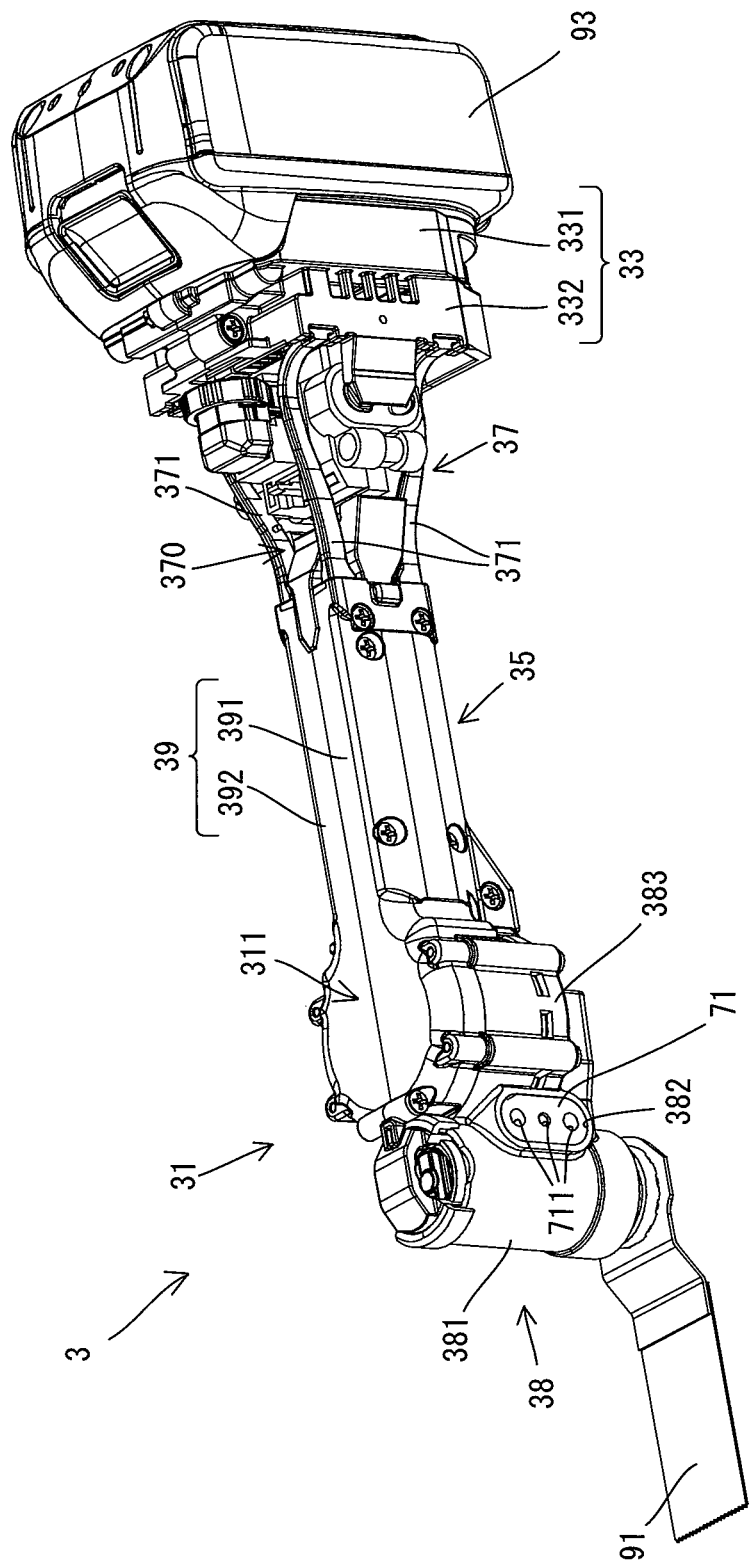
FIG. 5 is a perspective view of an inner housing with a switch holder connected thereto.

In the present embodiment, as shown in FIG. 5, the metal housing 38 and the plastic housing 39 are connected to each other in the up-down direction with screws at four positions of the motor-housing part 383 and the motor-cover part 311 in the circumferential direction. Further, the metal housing 38 and the plastic housing 39 are connected in the front-rear direction by connecting the contact part 387 and a portion of the plastic housing 39 which forms a front end portion of the extending part 35. Specifically, as shown in FIG. 3, the contact part 387 has two through holes extending through the contact part 387 in the left-right direction. Correspondingly, two inwardly protruding cylindrical parts are formed on the inside of a portion of each of the left shell 391 and the right shell 392 which forms the front end portion of the extending part 35. A female thread is formed in an inner peripheral surface of each of the cylindrical parts of the right shell 392. These cylindrical parts are inserted into the through holes from the left and right sides of the contact part 387, and screws are inserted into the cylindrical parts of the left shell 391 and then threadably engaged with the cylindrical parts of the right shell 392. Thus, the left shell 391, the contact part 387 and the right shell 392 are closely and firmly connected in the left-right direction by the axial force of the screws.

Further, in addition to the above-described connection positions, as shown in FIGS. 2 and 5, the left shell 391 and the right shell 392 are also connected to each other with screws at two positions in an upper rear end portion of the extending part 35 and at one position in a lower rear end portion of the extending part 35. A weight 300 is fixedly held between the left shell 391 and the right shell 392 at the above-mentioned two positions in the upper rear end portion of the extending part 35. The weight 300 will be described in detail later.

The internal configuration of the inner housing 3 is now described.

Figure 6:
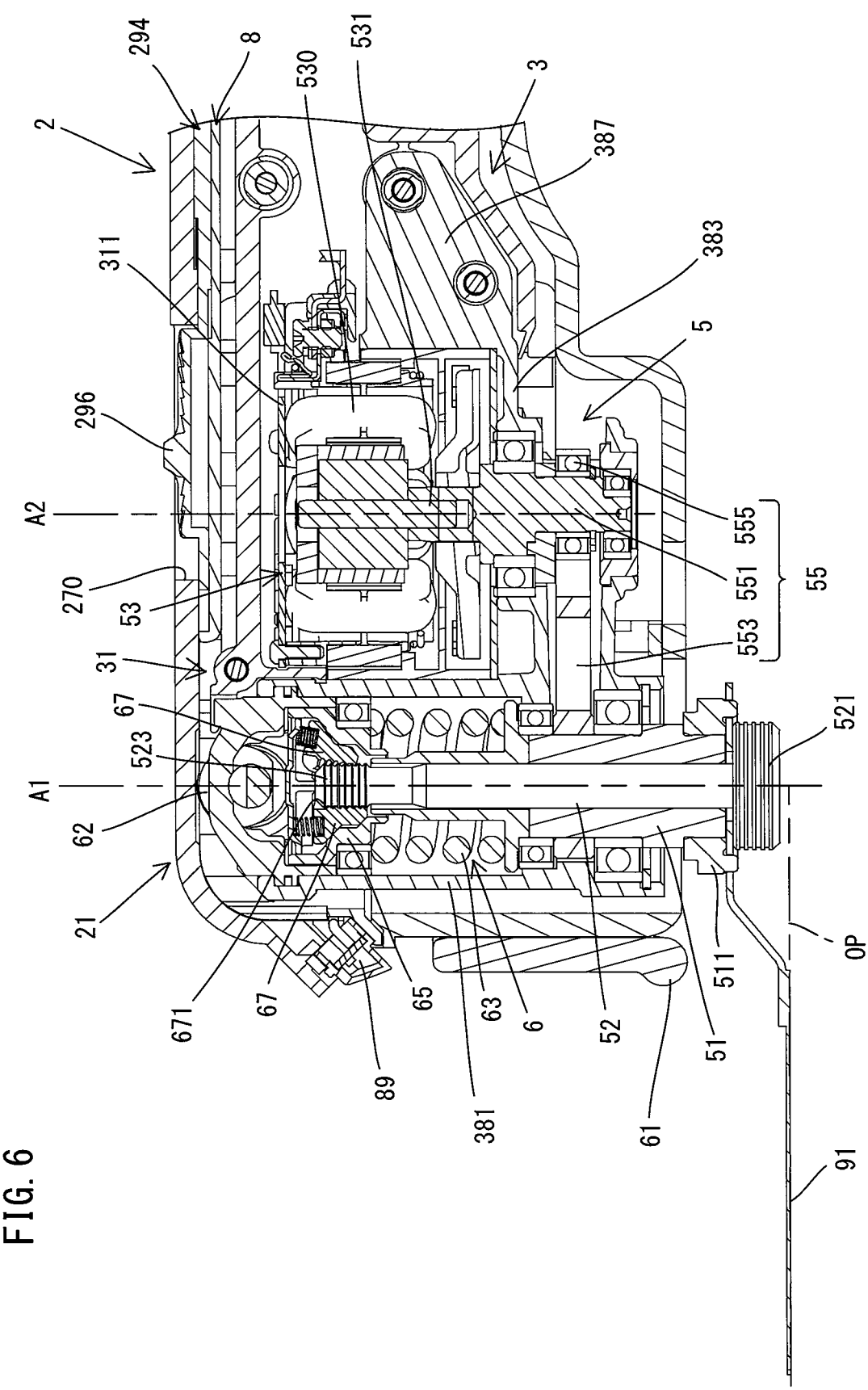
FIG. 6 is a partial, enlarged view of FIG. 2.

First, the internal configuration of the front-end part 31 is described. As shown in FIG. 6, the front-end part 31 of the inner housing 3 houses the driving mechanism 5 and the lock mechanism 6.

The driving mechanism 5 is described. As shown in FIG. 6, the driving mechanism 5 is configured to oscillatory drive the tool accessory 91 and includes the spindle 51, the motor 53 and a transmitting mechanism 55.

The spindle 51 is a hollow elongate member having a generally circular cylindrical shape. In the present embodiment, the spindle 51 is housed in a lower portion of the spindle-housing part 381 and supported to be rotatable around the axis A1 by two bearings. The lower end portion of the spindle 51 is exposed from the housing 1 to the outside, and has a flange-like tool-mounting part 511 which protrudes radially outward. The tool-mounting part 511 is configured to removably receive the tool accessory 91. In the present embodiment, the tool accessory 91 may be clamped between the tool-mounting part 511 and a clamp head 521 of a clamp shaft 52 held in a clamp position by the lock mechanism 6, which will be described later.

The motor 53, which is a driving source, has a motor body 530 and an output shaft 531. The motor body 530 includes a stator and a rotor. The output shaft 531 extends from the rotor and rotates together with the rotor. The motor 53 is housed in the motor-housing part 383 such that the axis A2 of the output shaft 531 extends in parallel to the axis A1 of the spindle 51 (that is, in the up-down direction). In the present embodiment, the output shaft 531 protrudes downward from the rotor. Further, a compact high-output brushless DC motor is employed as the motor 53.

Figure 7:
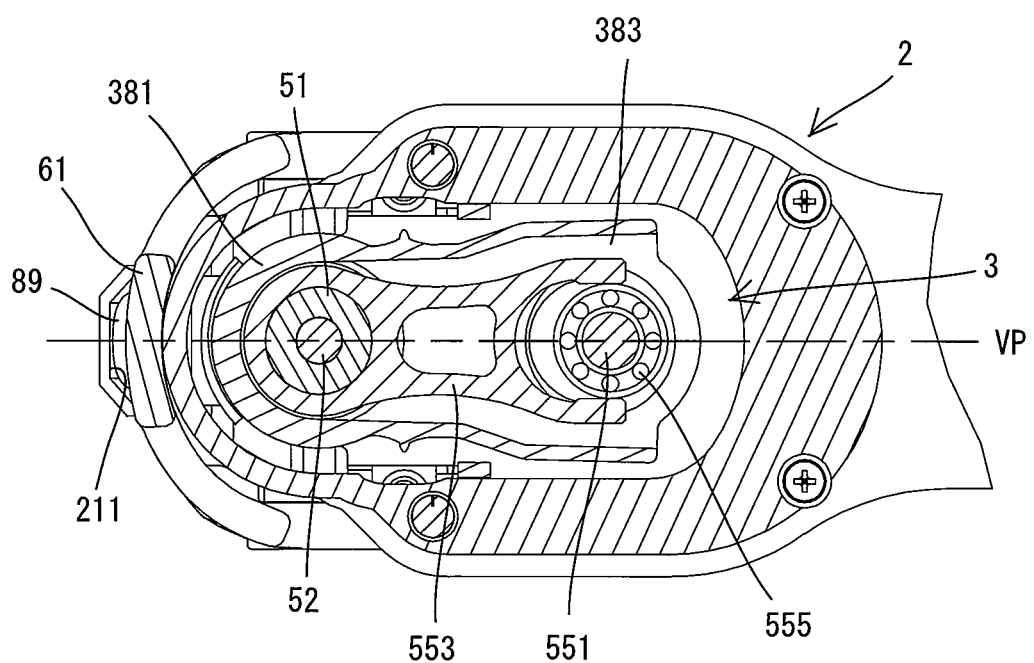
FIG. 7 is a sectional view taken along line VII-VII in FIG. 2.

The transmitting mechanism 55 is configured to transmit rotation of the output shaft 531 to the spindle 51 and reciprocally rotate the spindle 51 within a specified angle range around the axis A1. The transmitting mechanism 55 is disposed within the metal housing 38, over a lower portion of the spindle-housing part 381 and a lower portion of the motor-housing part 383. The transmitting mechanism 55 of the present embodiment includes an eccentric shaft 551, an oscillating arm 553 and a drive bearing 555. The structure of the transmitting mechanism 55 is well known and therefore only briefly described here. The eccentric shaft 551 is coaxially connected with the output shaft 531 of the motor 53 and has an eccentric part eccentric to the axis A2. The drive bearing 555 is mounted onto an outer periphery of the eccentric part. The oscillating arm 553 connects the drive bearing 555 and the spindle 51. As shown in FIG. 7, one end portion of the oscillating arm 553 is annularly formed and fixed to an outer periphery of the spindle 51. The other end portion of the oscillating arm 553 is bifurcated and disposed to come in contact with an outer periphery of the drive bearing 555 from the right and left.

When the motor 53 is driven, the eccentric shaft 551 rotates together with the output shaft 531. When the eccentric shaft 551 rotates, a center of the eccentric part moves around the axis A2 and thus the drive bearing 555 also moves around the axis A2, which causes the oscillating arm 553 to oscillate on the axis A1 of the spindle 51 within the specified angle range. When the oscillating arm 553 oscillates, the spindle 51 reciprocally rotates around the axis A1 within the specified angle range since one end portion of the oscillating arm 553 is fixed to the spindle 51. As a result, the tool accessory 91 fixed to the spindle 51 (more specifically, the tool-mounting part 511) is oscillatory driven around the axis A1 in the oscillation plane OP, so that a processing operation can be performed. When the blade as shown in the drawings is mounted as the tool accessory 91, the oscillating direction of the tool accessory 91 generally corresponds to the left-right direction.

Figure 8:
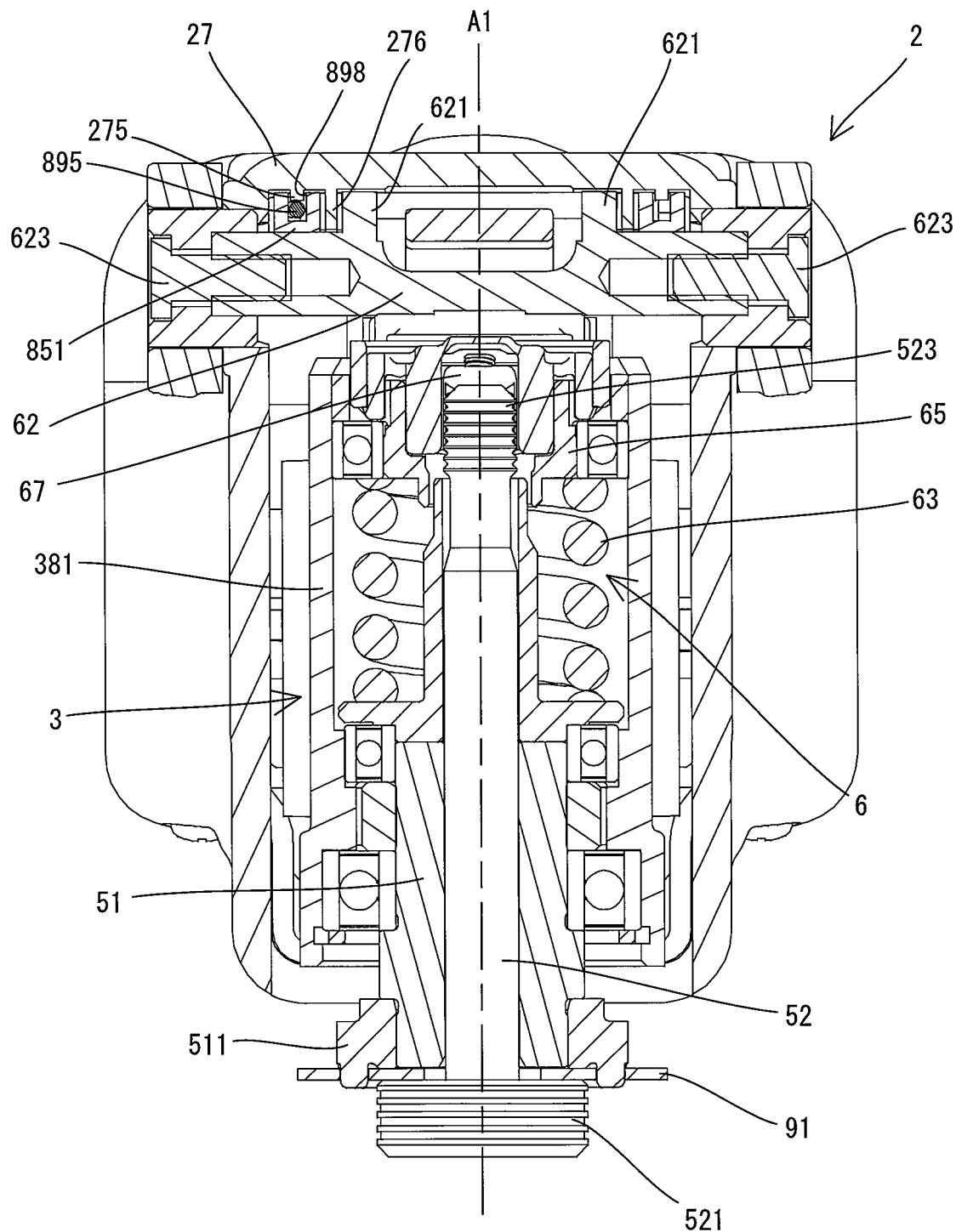
FIG. 8 is a sectional view taken along line VIII-VIII in FIG. 2.

The lock mechanism 6 is now described. The lock mechanism 6 is configured to lock the clamp shaft 52 in the clamp position (as shown in FIGS. 6 and 8). The clamp position is a position of the clamp shaft 52 in which the clamp shaft 52 and the spindle 51 are capable of clamping the tool accessory 91. As shown in FIGS. 6 and 8, the clamp shaft 52 is an elongate member having a generally cylindrical column shape. The clamp shaft 52 is configured to be coaxially inserted into the spindle 51 in the axis A1 direction. The clamp shaft 52 has the flange-like clamp head 521 on its lower end. Further, a groove part 523 is formed in an upper end portion of the clamp shaft 52. The groove part 523 has a plurality of annular grooves arranged in the up-down direction around the entire circumference of the clamp shaft 52.

The lock mechanism 6 of the present embodiment is disposed above the spindle 51 within the spindle-housing part 381. The lock mechanism 6 includes a compression coil spring 63, a collar 65 and a pair of clamp members 67. The basic structure of the lock mechanism 6 is well known and therefore only briefly described here. The collar 65 is annularly formed and rotatably supported by a bearing held within an upper portion of the spindle-housing part 381. The collar 65 is always biased upward by the compression coil spring 63 disposed between the spindle 51 and the collar 65. The pair of clamp members 67 are always biased downward and disposed to face with each other in the front-rear direction within an inner space of the collar 65. A ridge part 671 is formed on each of opposed surfaces of the clamp members 67. The ridge part 671 has a plurality of horizontally extending ridges formed in the up-down direction.

The lock mechanism 6 is configured to operate in interlock with a user's operation of turning the operation lever 61. The operation lever 61 is connected to a rotary shaft 62. As shown in FIG. 8, the rotary shaft 62 is supported above the lock mechanism 6 by the outer housing 2 so as to be rotatable around a rotation axis which extends in the left-right direction. The operation lever 61 is connected to left and right end portions of the rotary shaft 62 via screws 623. The rotary shaft 62 rotates together with the operation lever 61 when the operation lever 61 is turned. It is noted that, in the present embodiment, the rotary shaft 62 and the screws 623 are made of metal.

The rotary shaft 62 has an eccentric part 621 eccentric to the rotation axis of the rotary shaft 62. When the operation lever 61 is placed at a lock position shown in FIG. 1, as shown in FIGS. 6 and 8, a smaller-diameter part of the eccentric part 621 is located at an upper position away from the collar 65. Therefore, the collar 65 is biased upward by the compression coil spring 63 and located at an uppermost position. On the other hand, the clamp member 67 is biased downward. Therefore, the clamp member 67 is moved inward in the radial direction of the collar 65 by interaction between an inclined surface formed in a portion of an inner peripheral surface of the collar 65 and an inclined surface formed in a portion of an outer peripheral surface of the clamp member 67. As a result, the ridge part 671 and the groove part 523 are engaged with each other, and the clamp shaft 52 is clamped between the clamp members 67. In this state, the clamp shaft 52 is biased upward by the compression coil spring 63 and locked in the clamp position. In this manner, the tool accessory 91 is clamped between the tool-mounting part 511 and the clamp head 521 and thus fixed to the spindle 51.

When the operation lever 61 is turned upward from the lock position shown in FIG. 1 to an unlock position, a larger-diameter part of the eccentric part 621 comes into contact with an upper end portion of the collar 65 from above and pushes down the collar 65 against the biasing force of the compression coil spring 63. The clamp member 67 is also pushed together with the collar 65 down to a specified position and prohibited from further moving downward. In this state, when only the collar 65 is further moved to a lowermost position, the inclined surfaces of the collar 65 and the clamp member 67 comes out of contact with each other, so that the clamp member 67 is allowed to move radially outward. In other words, the clamp shaft 52 is unlocked, so that the user can pull the clamp shaft 52 out of the spindle 51.

Figure 9:
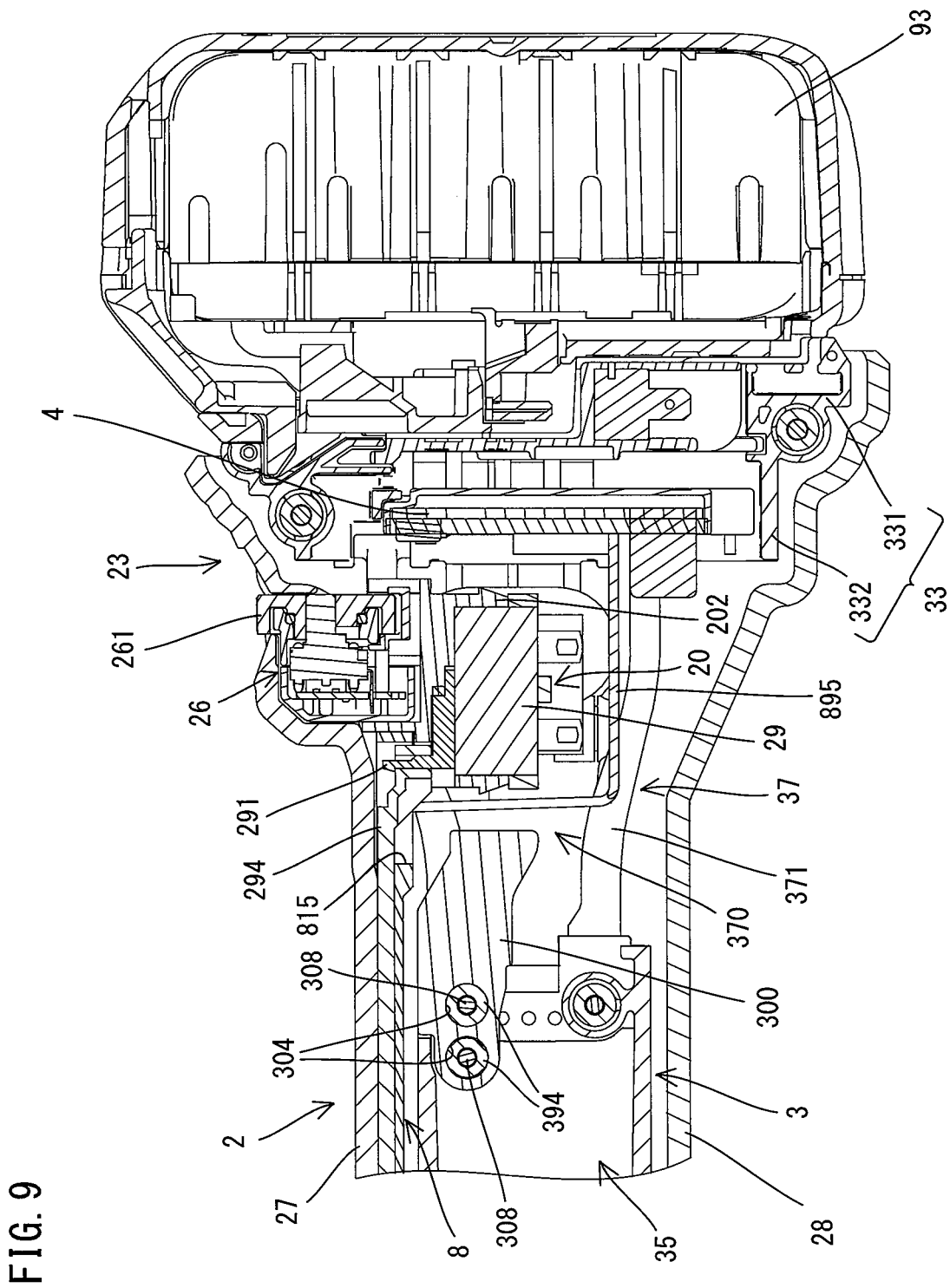
FIG. 9 is another partial, enlarged view of FIG. 2.
Figure 10:
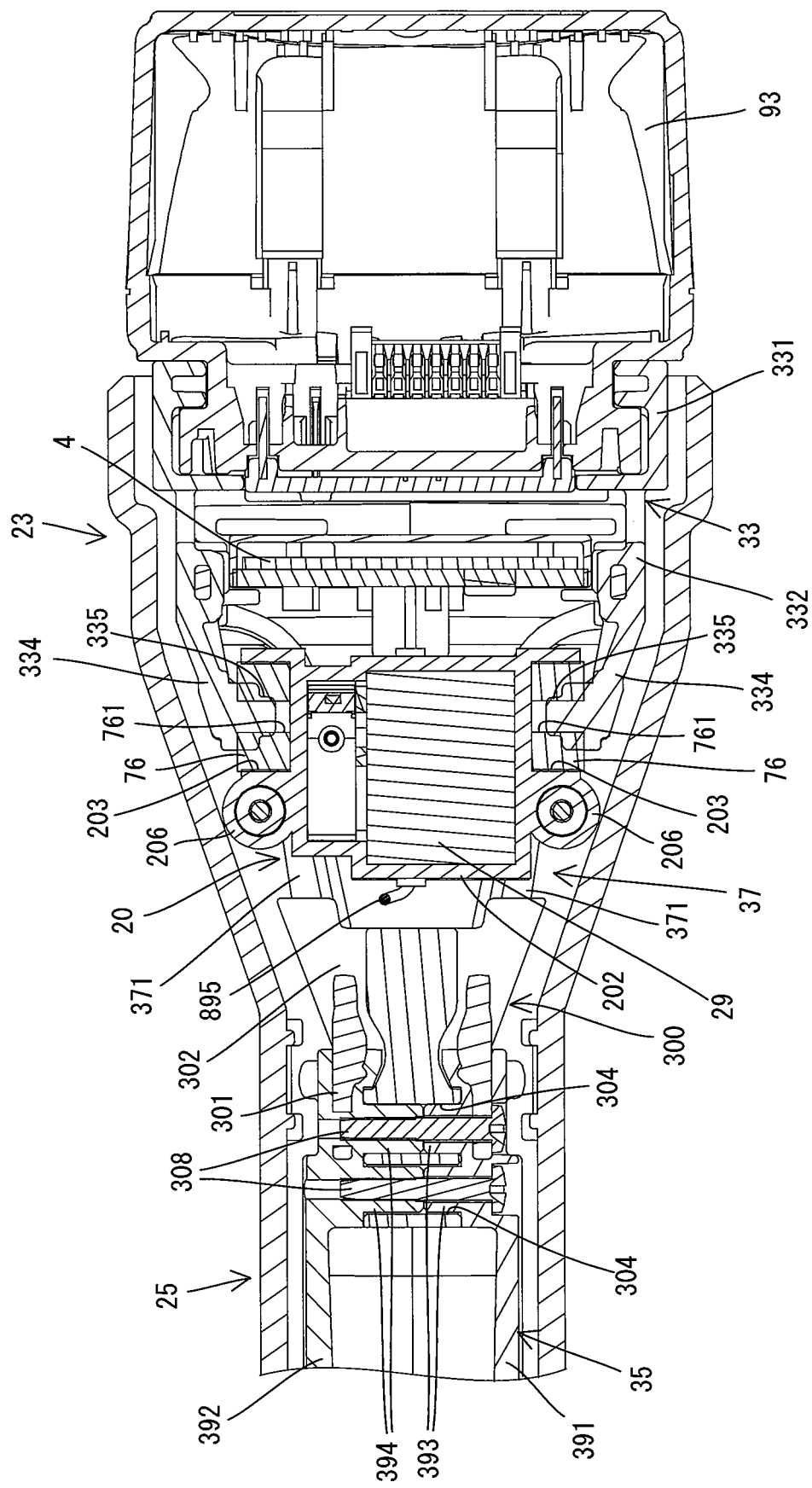
FIG. 10 is a partial, enlarged view of FIG. 4.

The internal configuration of the rear-end part 33 is now described. As shown in FIGS. 9 and 10, a power receiving terminal is disposed within the battery-mounting part 331 which forms the rear portion of the rear-end part 33. The power receiving terminal is configured to be electrically connected to a power feeding terminal of the battery 93 when the battery 93 is engaged with the battery-mounting part 331. In other words, the battery-mounting part 331 is configured as a power-source-related device which is configured to enable power supply from the battery 93, which is a power source, to the motor 53, the illumination unit 89 and the control unit 4. It is noted that the battery-mounting part 331 and its internal configuration itself are well known and therefore not described in detail.

The control unit 4 is housed in the control-unit-housing part 332 which forms the front portion of the rear-end part 33. In the present embodiment, the control unit 4 includes a three-phase inverter, a CPU, and so on. The three-phase inverter is configured to drive the motor 53 by using switching elements. The CPU is configured to control driving of the motor 53 via the three-phase inverter. The control unit 4 is electrically connected to the battery-mounting part 331 via wiring (not shown). In the present embodiment, the power is supplied to the motor 53 and the illumination unit 89 via the control unit 4.

The internal configuration of the extending part 35 is now described. In the present embodiment, the driving mechanism 5 (the spindle 51, the motor 53 and the transmitting mechanism 55) is disposed in the front-end part 31, and the battery-mounting part 331 is disposed in the rear-end part 33, so that the number of components to be disposed in the extending part 35 can be minimized. Therefore, as shown in FIGS. 2 and 5, the extending part 35 is formed thinner than the front-end part 31 and the rear-end part 33 in order to provide an easy-to-hold thickness for the grip part 25. It is noted that wiring and a connecting terminal (which are not shown) for connecting the control unit 4 disposed in the rear-end part 33 and the motor 53 disposed in the front-end part 31 are disposed in a lower portion of the extending part 35. Further, as described above, the weight 300 is fixed in the upper rear end portion of the extending part 35 in a state in which the weight 300 is held between the left shell 391 and the right shell 392.

The weight 300 and a structure of mounting the weight 300 are now described. The weight 300 is mounted to the extending part 35 in order to increase the inertia moment of the inner housing 3 (in particular, the front-end part 31 which houses the driving mechanism 5, and the extending part 35 immovably connected to the front-end part 31) around the axis A1 of the spindle 51. In the present embodiment, the weight 300 has only a function of increasing the mass of the inner housing 3 having the weight 300 mounted thereto and adjusting the mass distribution of the inner housing 3. The weight 300 is made of metal (for example, iron, zinc, aluminum or an alloy containing any one of them) having a higher density than at least the synthetic resin forming the plastic housing 39.

Figure 11:
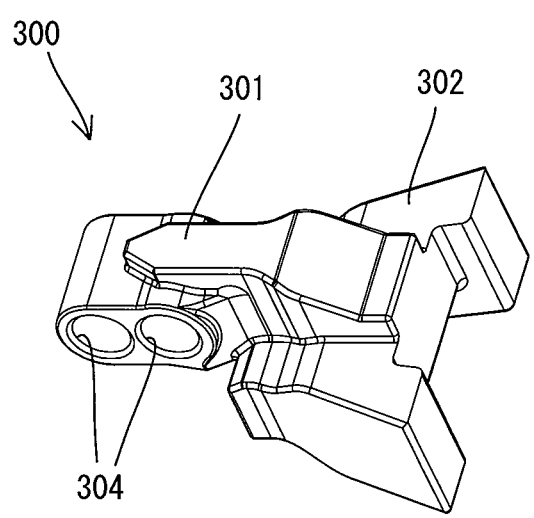
FIG. 11 is a perspective view of a weight.

As shown in FIG. 11, the weight 300 has a rear part 302 which is gradually widened in the left-right direction toward the rear, as viewed from above. Further, the weight 300 has a front part 301 having two through holes 304 which extend through the front part 301 in the left-right direction. Correspondingly, as shown in FIGS. 9 and 10, two cylindrical parts 393 and two cylindrical parts 394 are respectively formed to protrude inward on the inside of portions of the left shell 391 and the right shell 392 which form an upper rear end portion of the extending part 35. A female thread is formed in an inner peripheral surface of each of the cylindrical parts 394 of the right shell 392. The cylindrical parts 393, 394 are inserted into the through holes 304 from the left and right sides of the weight 300, and screws 308 are inserted into the cylindrical parts 393 of the left shell 391 and then threadably engaged with the cylindrical parts 394 of the right shell 392. Thus, the left shell 391, the weight 300 and the right shell 392 are firmly connected in the left-right direction by the axial force of the screws 308, so that the weight 300 is made substantially immovable relative to the extending part 35.

The weight 300 is disposed in a rear end region of a portion of the inner housing 3 which houses the driving mechanism 5 (the spindle 51, the motor 53 and the transmitting mechanism 55) and which can be regarded as a single rigid body. In other words, the weight 300 is disposed in a rear end region of a portion of the inner housing 3 including the front-end part 31 and the extending part 35, or, a portion located frontward of the elastic connection part 37 having flexibility. By providing the weight 300 to the rear end portion of the extending part 35, the inertia moment of the portion including the front-end part 31 and the extending part 35 can be effectively increased. Further, in the present embodiment, an inertia moment M1 is set to be not less than 25 times and not more than 35 times of an inertia moment M2. The inertia moment M1 is an inertia moment of the portion including the front-end part 31 and the extending part 35 around the axis A1, with the driving mechanism 5 housed therein and the weight 300 mounted thereto. The inertia moment M2 is an inertia moment of a tool accessory 91 around the axis A1, which tool accessory 91 having the largest mass among tool accessories 91 which can be mounted to the oscillating tool 100.

Figure 12:
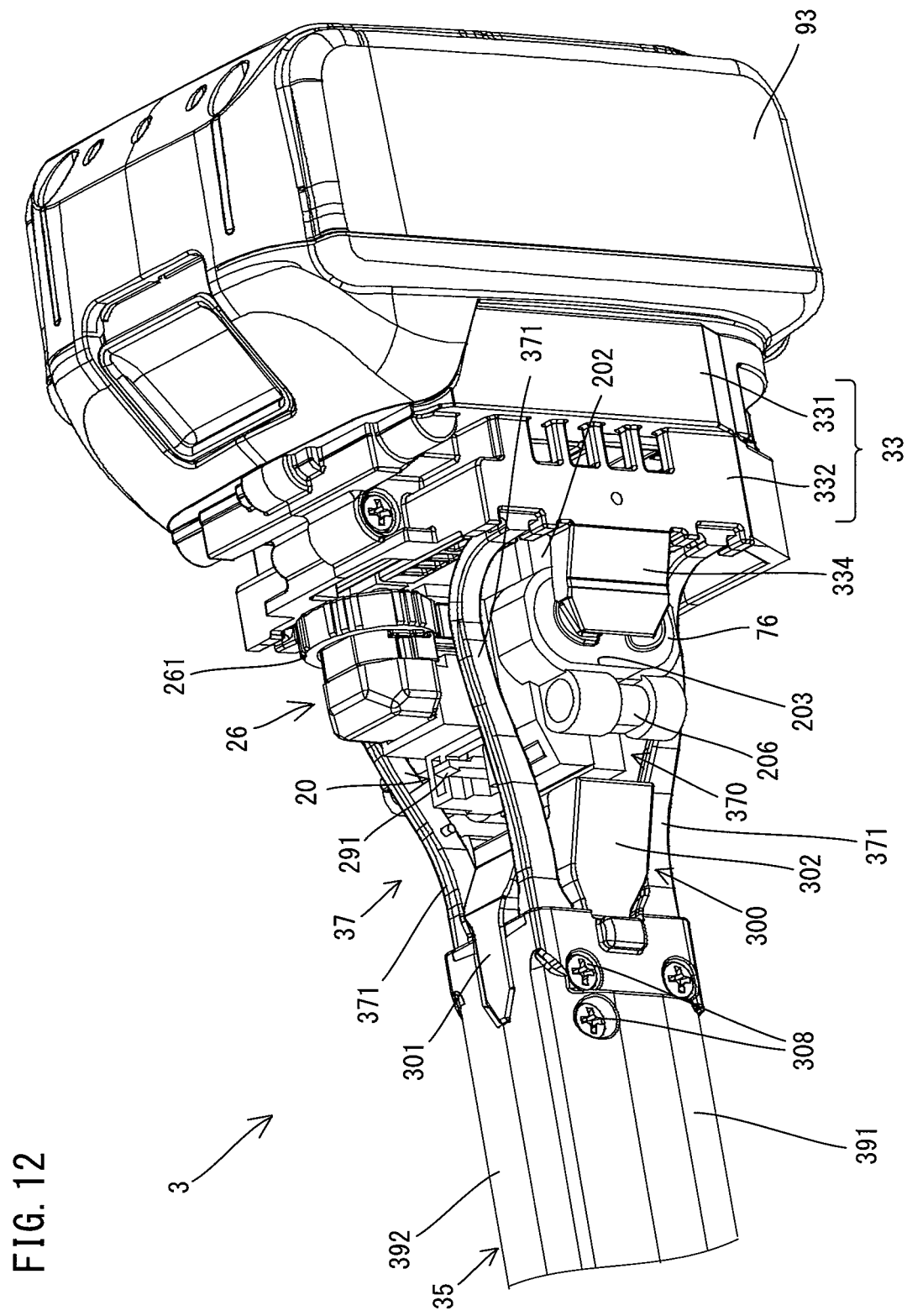
FIG. 12 is a partial, enlarged view of FIG. 5.

The internal configuration of the elastic connection part 37 is now described. As shown in FIG. 12, the rear part 302 of the weight 300 is disposed in a front region of an internal space 370 (a space region surrounded by the elastic ribs 371 in the circumferential direction) of the elastic connection part 37. Most of the rear part 302 of the weight 300 is located in the internal space 370, but right and left end portions of the rear part 302 protrude outward through the openings between the elastic ribs 371.

Further, the switch holder 20 is disposed in a rear region of the internal space 370. The switch holder 20 is a member which is configured to hold the switch 29 (see FIG. 10) for driving and stopping the motor 53. In the present embodiment, the switch holder 20 also holds a speed-change dial unit 26. The speed-change dial unit 26 is configured as an operation device for steplessly setting the rotation speed of the motor 53. The speed-change dial unit 26 has a variable resistor and is configured to output a resistance value to the control unit 4 in response to a user's turning operation of a dial 261. Most of the switch holder 20 is disposed in the internal space 370 of the elastic connection part 37 as described above, but the switch holder 20 is fixed to the upper shell 27 and the lower shell 28 and forms a portion of the outer housing 2.

Figure 13:
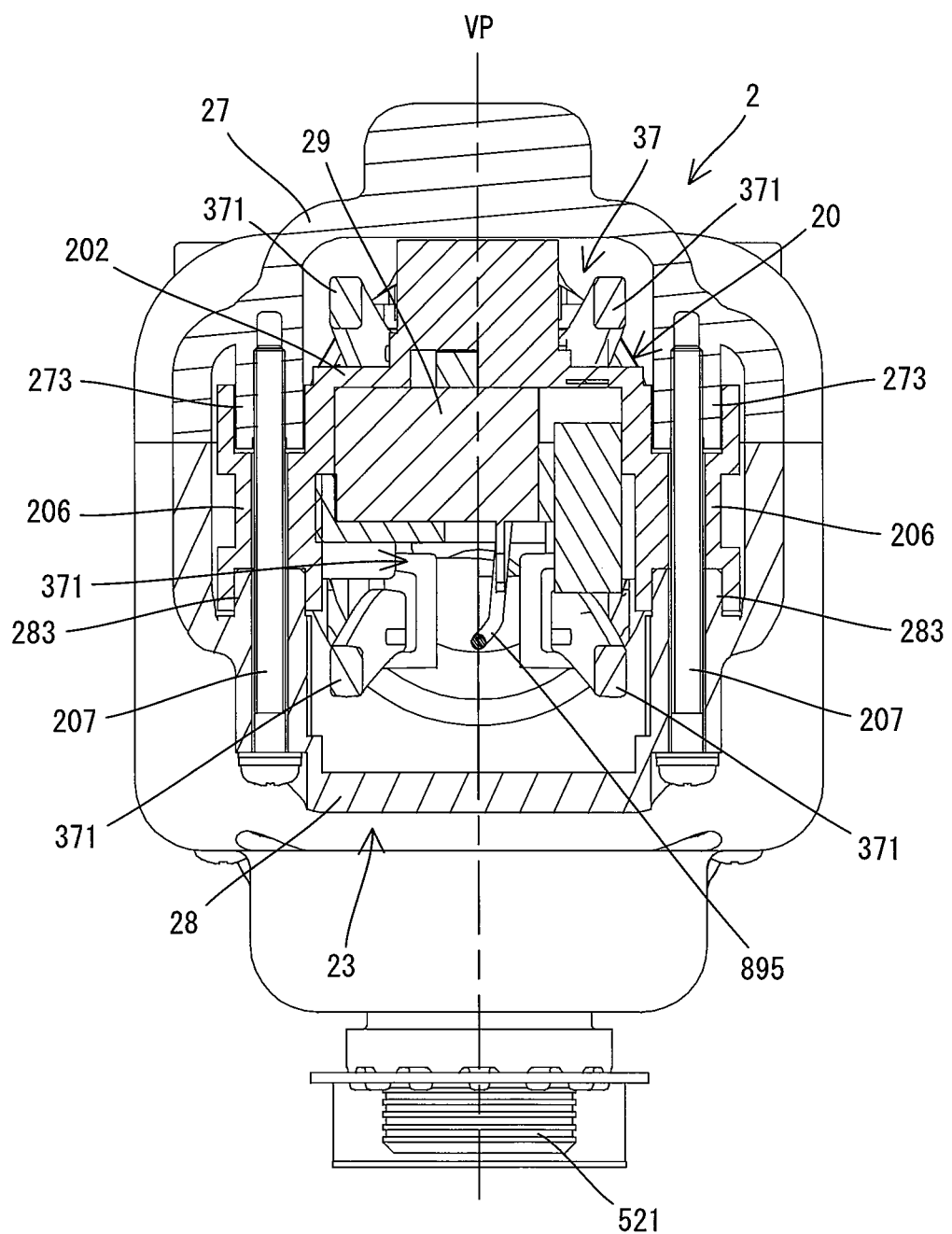
FIG. 13 is a sectional view taken along line XIII-XIII in FIG. 2.

Specifically, as shown in FIG. 13, the switch holder 20 has a body 202 and a pair of cylindrical parts 206. The body 202 holds the switch 29 and the speed-change dial unit 26 (see FIG. 12). Most of the body 202 is disposed in the internal space 370, but right and left end portions of the body 202 are disposed outside the internal space 370. The cylindrical parts 206 have a circular cylindrical shape extending in the up-down direction and are connected to the right and left front end portions of the body 202. The cylindrical parts 206 are disposed outside the internal space 370. A pair of right and left cylindrical parts 283 are formed to protrude upward from a lower wall of the lower shell 28, and a pair of right and left cylindrical parts 273 are formed to protrude downward from the upper shell 27 at positions corresponding to the cylindrical parts 283. Each of the cylindrical parts 273 has a female thread formed in its inner peripheral surface. The cylindrical parts 273, 283 are respectively fitted in large-diameter parts formed in upper and lower end portions of the cylindrical part 206 of the switch holder 20, and then screws 207 are respectively inserted through the cylindrical parts 206 from below the cylindrical parts 283 and threadably engaged with the cylindrical parts 273. Thus, the switch holder 20 is fixed to the upper shell 27 and the lower shell 28.

A structure of elastically connecting the outer housing 2 and the inner housing 3 is now described. In the present embodiment, the outer housing 2 and the inner housing 3 are connected to each other via elastic members at plural separate positions in the front-rear direction. Specifically, two front elastic members 71 are disposed between the front-end part 21 of the outer housing part 2 and the front-end part 31 of the inner housing 3 (see FIG. 14). Further, two rear elastic members 76 are disposed between the switch holder 20 of the outer housing 2 and the rear-end part 33 of the inner housing 3 (see FIG. 10).

Figure 14:
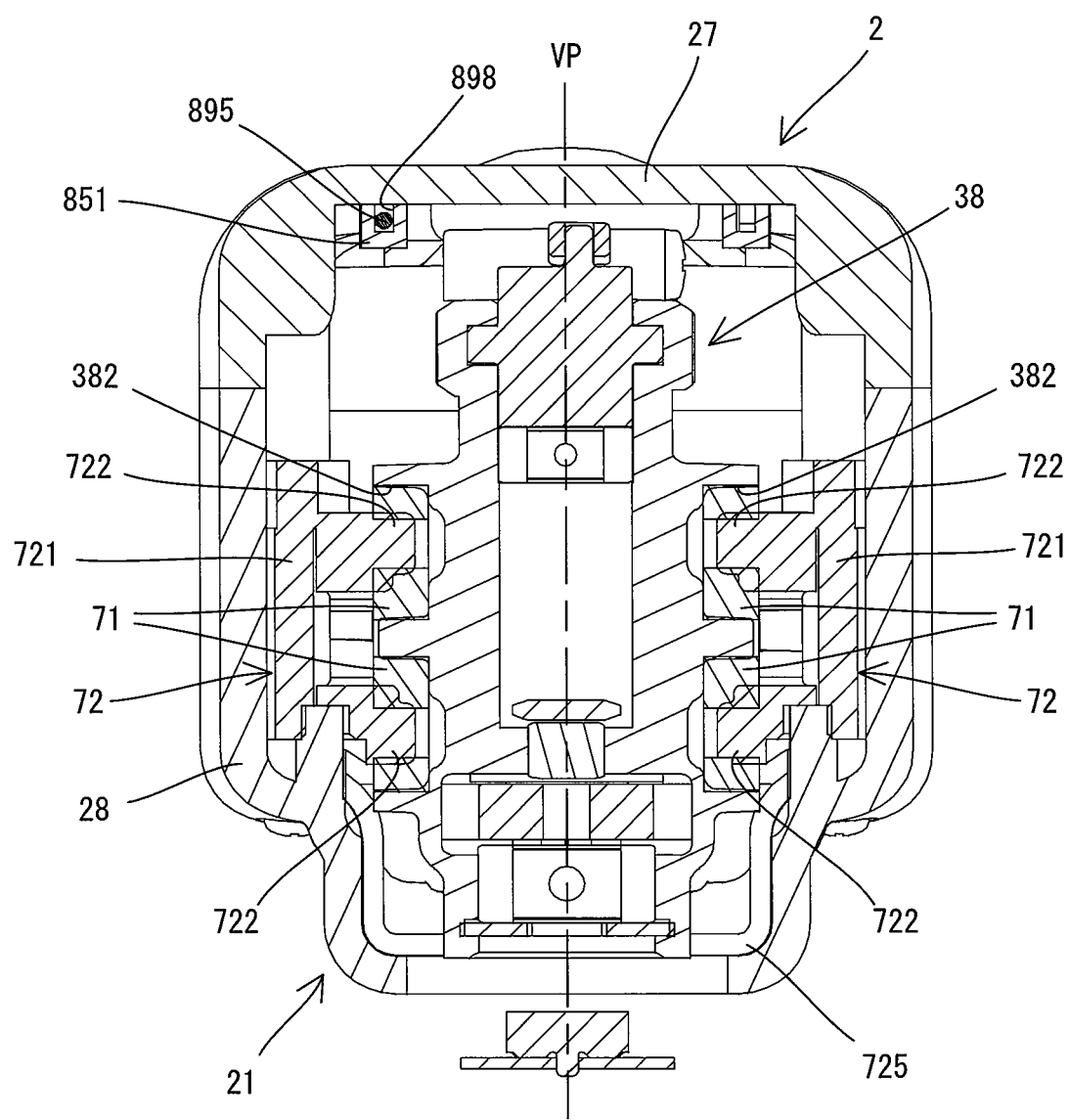
FIG. 14 is a sectional view taken along line XIV-XIV in FIG. 2.

First, arrangement of the front elastic members 71 is described. As shown in FIG. 5, recesses 382 each having an elliptical shape in a side view are formed in a boundary region between the spindle-housing part 381 and the motor-housing part 383 of the metal housing 38. The front elastic members 71 are respectively fitted in the recesses 382. The front elastic member 71 has three through holes 711 spaced apart from each other in the up-down direction. A projection is formed on a bottom of the recess 382 and fitted in the middle one of the through holes 711. As shown in FIG. 14, the recesses 382 are symmetrically provided on the right and left sides of the front-end part 31. In the present embodiment, the front elastic members 71 are made of a material having a microfoam structure (also referred to as a microcellular structure). For example, a urethane foam having the microcellular structure (urethane-based resin having the microcellular structure) may be employed. In the present embodiment, among such kinds of urethane foams, microcellular polyurethane elastomer is employed. The microcellular polyurethane elastomer has especially superior vibration absorbability and durability.

In the present embodiment, the front elastic members 71 are connected to a connecting member 72 which is fixed to the outer housing 2. The connecting member 72 includes a pair of cylindrical parts 721 which extends in parallel to each other, and a generally U-shaped base 725 which connects the cylindrical parts 721. The connecting member 72 is fixed to the outer housing 2, with the base 725 disposed on a bottom of the lower shell 28 below the metal housing 38 and with the cylindrical parts 721 extending upward and facing the front elastic members 71.

Figure 15:
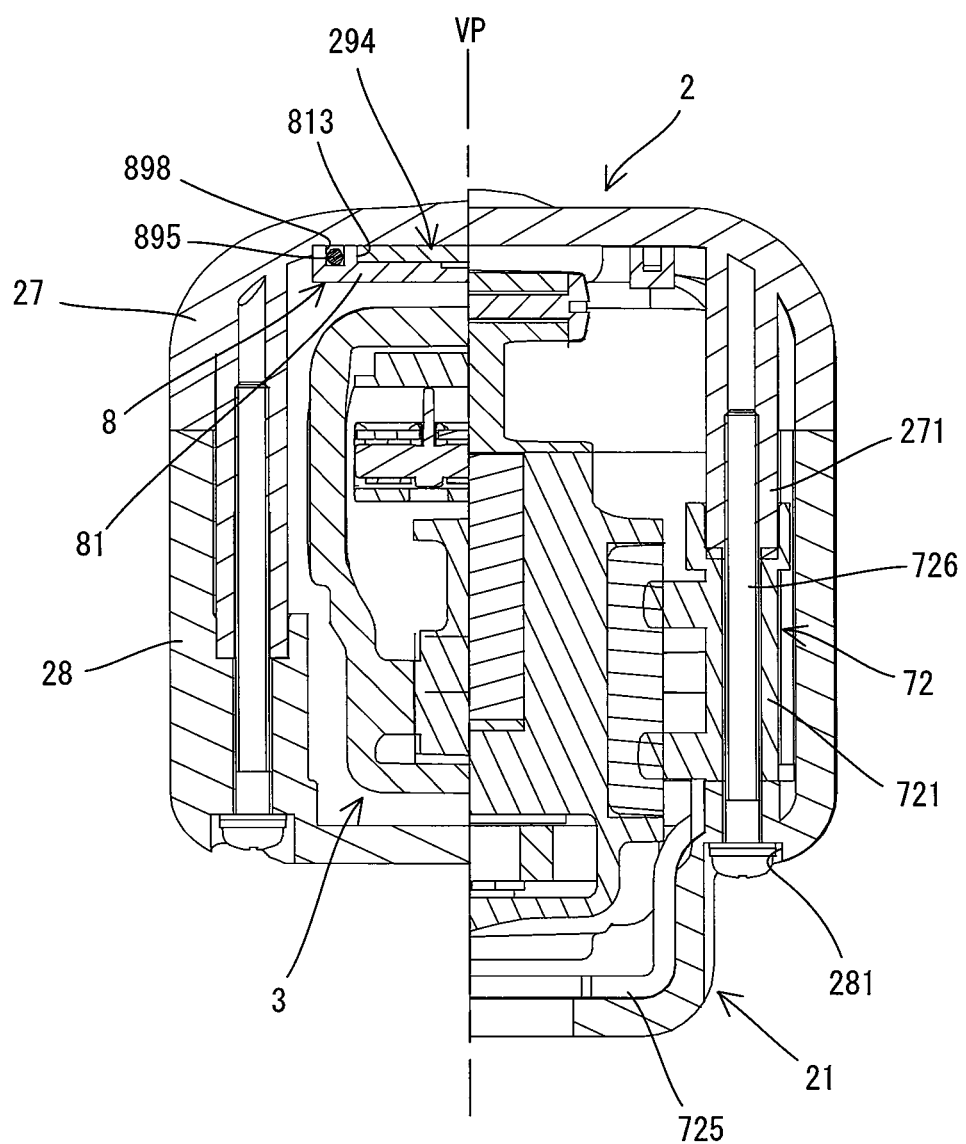
FIG. 15 is a sectional view taken along line XV-XV in FIG. 4.

Specifically, as shown in FIG. 15, a pair of through holes 281 are formed through the lower shell 28 in left and right front end portions of the front-end part 21 of the outer housing 2, and a pair of downwardly extending cylindrical parts 271 are formed on the upper shell 27 at positions corresponding to the through holes 281 (only the left through hole 281 and the left cylindrical part 271 are shown in FIG. 15). Each of the cylindrical parts 271 has a female thread formed in its inner peripheral surface. The cylindrical parts 271 of the upper shell 27 are fitted in respective large-diameter parts formed in upper end portions of the cylindrical parts 721 of the connecting member 72, and screws 726 are respectively inserted through the cylindrical parts 721 from below the through holes 281 and threadably engaged with the cylindrical parts 271. Thus, the connecting member 72 is fixed to the outer housing 2. In other words, the connecting member 72 forms a portion of the outer housing 2. As shown in FIG. 15, the upper shell 27 and the lower shell 28 are also fixedly connected together with screws in left and right rear end portions of the front-end part 21 (only the right rear end portion is shown in FIG. 15).

As shown in FIG. 14, each of the cylindrical parts 721 of the connecting member 72 has two projections 722 protruding toward the inner housing 3. Ends of the projections 722 are respectively fitted in the upper and lower ones of the three through holes 711 (see FIG. 5) of the front elastic member 71. Each of the ends of the projections 722 is disposed with a clearance from the bottom of the recess 382 while pressing the front elastic member 71 toward the bottom. The entire outer periphery of the projection 722 is covered with the front elastic member 71. Therefore, the projection 722 is allowed to relatively move within the recess 382 while compressing the front elastic member 71 in all of the up-down, front-rear and left-right directions. Thus, the front-end part 21 of the outer housing 2 is connected to the front-end part 31 of the inner housing 3 via the front elastic members 71 so as to be movable in all directions relative to the front-end part 31.

Figure 16:
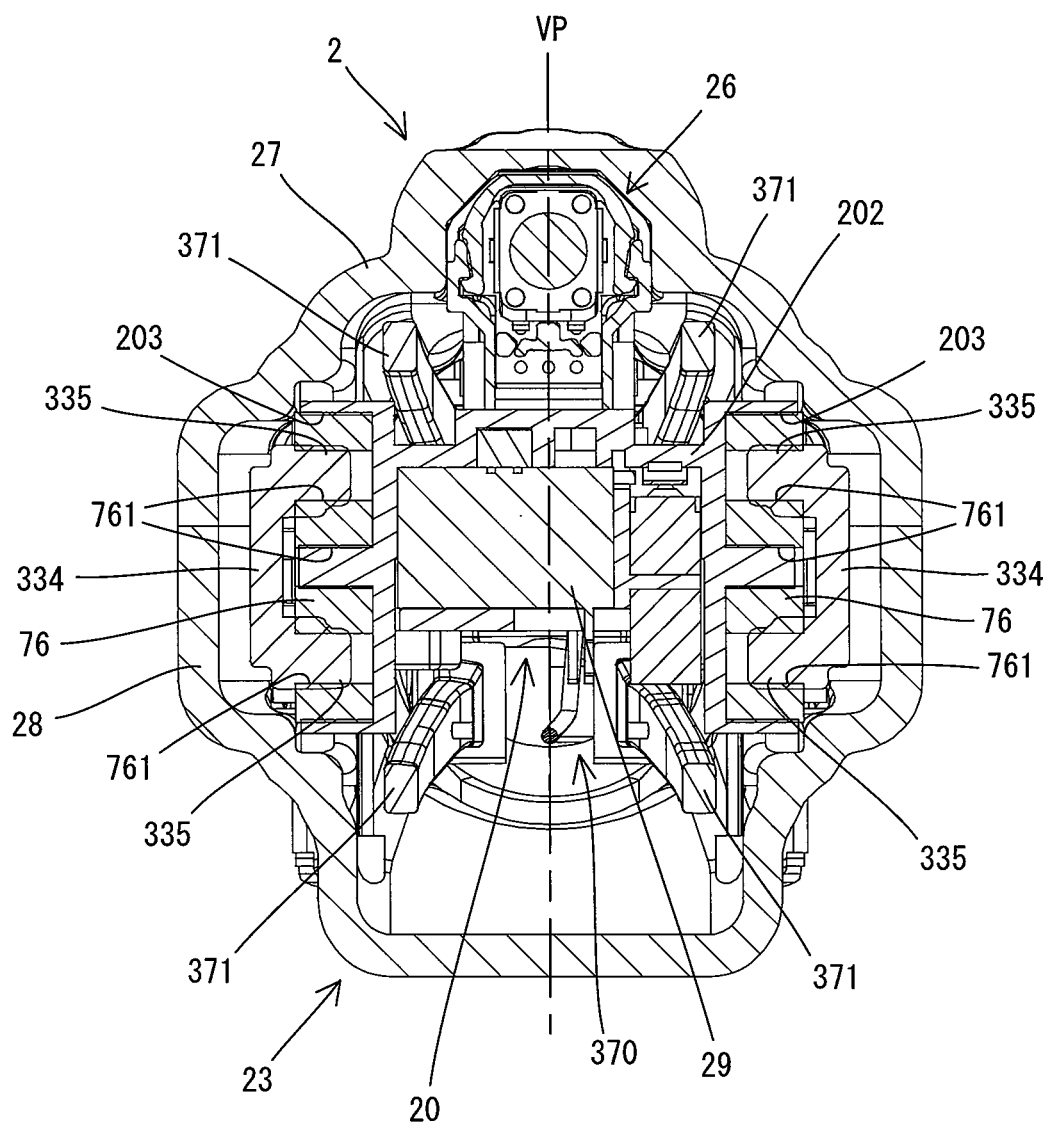
FIG. 16 is a sectional view taken along line XVI-XVI in FIG. 4.

Arrangement of the rear elastic members 76 is now described. As shown in FIGS. 10, 12 and 16, the switch holder 20 is disposed in the internal space 370 of the elastic connection part 37. Recesses 203 each having an elliptic shape in a side view are provided on the right and left sides of the body 202. The rear elastic members 76 having substantially the same structure as the front elastic members 71 are fitted in the recesses 203. Specifically, each of the rear elastic members 76 has three through holes 761 spaced apart from each other in the up-down direction. A projection is formed on a bottom of the recess 203 and fitted in the middle one of the through holes 761. As the rear elastic members 76, for example, urethane foam having a microfoam structure can be employed. In the present embodiment, like the front elastic members 71, the rear elastic members 76 are also made of microcellular polyurethane elastomer.

The rear-end part 33 of the inner housing 3 has a pair of arm parts 334. The arm parts 334 extend obliquely forward toward each other from a front end of the control-unit-housing part 332. Two projections 335 are formed on an extending end portion of each of the arm parts 334 and protrude toward the rear elastic member 76 fitted in the recess 203 of the switch holder 20. As shown in FIG. 16, the projections 335 are respectively fitted in the upper and lower ones of the three through holes 761 of the rear elastic member 76 fitted in the recess 203. Each of the projections 335 of the arm part 334 is disposed with a clearance from the bottom of the recess 203 while pressing the rear elastic member 76 toward the bottom. The entire outer periphery of the projection 335 is covered with the rear elastic member 76. Therefore, the projection 335 is allowed to relatively move within the recess 302 while compressing the rear elastic member 76 in all of the up-down, front-rear and left-right directions. Thus, the switch holder 20 forming a portion of the outer housing 2 is connected to the rear-end part 33 of the inner housing 3 via the rear elastic members 76 so as to be movable in all directions relative to the rear-end part 33.

When assembling the housing 1, the switch holder 20 is connected to the rear-end part 33 via the rear elastic members 76 and thereafter fixed to the upper shell 27 and the lower shell 28 via the cylindrical parts 206, as described above. In the present embodiment, the openings are defined between the adjacent elastic ribs 371 in the circumferential direction and provide communication between the internal space 370 and the outside. Therefore, the switch holder 20 can be easily disposed in the internal space 370 through the openings between the elastic ribs 371, as shown in FIG. 12. Further, in the present embodiment, the cylindrical parts 206 and the recesses 203 of the switch holder 20 protrude out of the internal space 370 through the openings. Therefore, after the switch holder 20 is disposed in the internal space 370, the switch holder 20 can be easily connected to the rear-end part 33 via the rear elastic members 76. Further, the switch holder 20 can be easily connected to the upper shell 27 and the lower shell 28.

A switching member 294 for switching on and off the switch 29 is now described. As shown in FIG. 9, an actuation part 291 having a movable contact is provided on top of the switch 29. The actuation part 291 is disposed to be movable in the front-rear direction between an ON position in which the movable contact is in contact with a fixed contact and an OFF position in which the movable contact is out of contact with the fixed contact. The ON position is located forward of the OFF position. The switching member 294 is connected to the actuation part 291.

Figure 17:
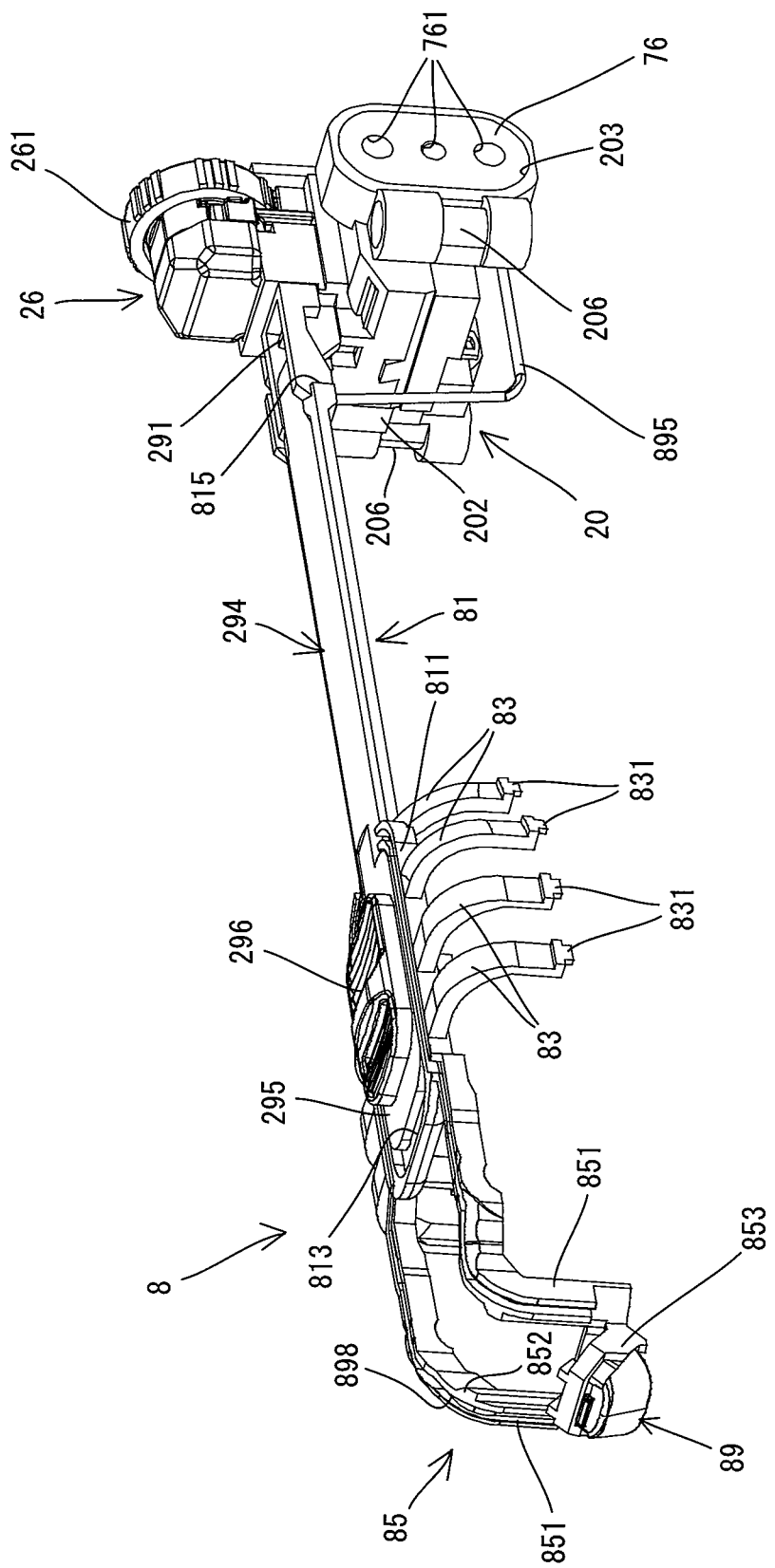
FIG. 17 is a perspective view showing the switch holder, a guide member and a switching member.
Figure 18:
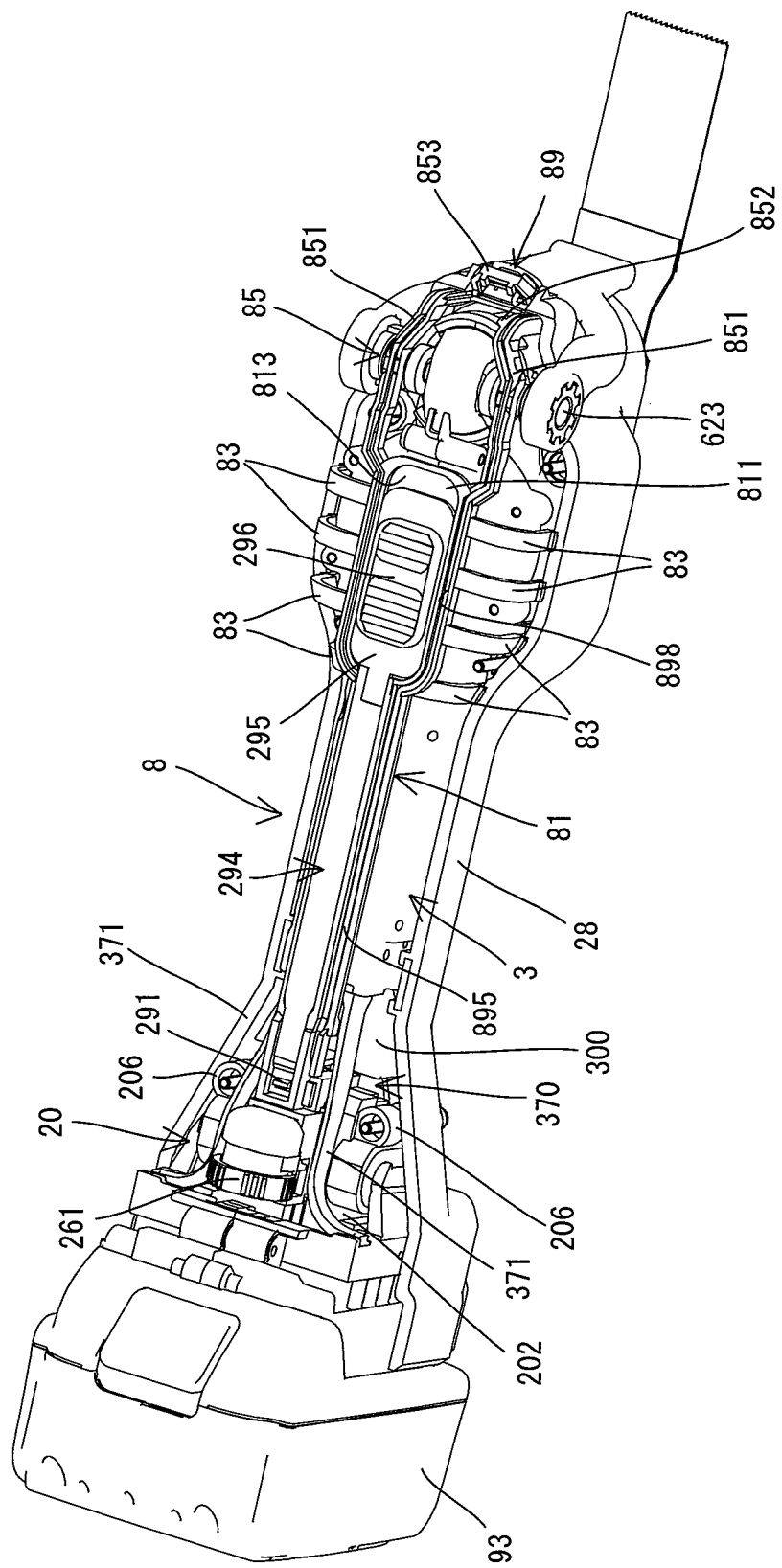
FIG. 18 is a perspective view showing a lower shell, the inner housing, the switch holder, the guide member and the switching member.

The structure of the switching member 294 is now described in detail. As shown in FIGS. 17 and 18, the switching member 294 is an elongate member linearly extending in the front-rear direction. A front-end part 295 of the switching member 294 has a generally rectangular shape slightly larger than the operation part 296. The operation part 296 is integrally formed on an upper surface of the front-end part 295. A portion of the switching member 294 which extends rearward from the front-end part 295 has a band-like shape having a smaller width in the left-right direction and a longer length in the front-rear direction than the front-end part 295. A rear end portion of the switching member 294 is connected to the actuation part 291 of the switch 29. In the present embodiment, the switching member 294 is a single member formed of synthetic resin. The switching member 294 may, however, be formed by connecting a portion including the operation part 296 and another portion.

The switching member 294 is configured to move the actuation part 291 between the ON position and the OFF position (or turn the switch 29 on and off) by moving in the front-rear direction, in response to a user's operation of sliding the operation part 296 in the front-rear direction. In the present embodiment, the switching member 294 is held by a guide member 8 supported by the outer housing 2, so as to be movable in the front-rear direction relative to the outer housing 2.

Figure 19:
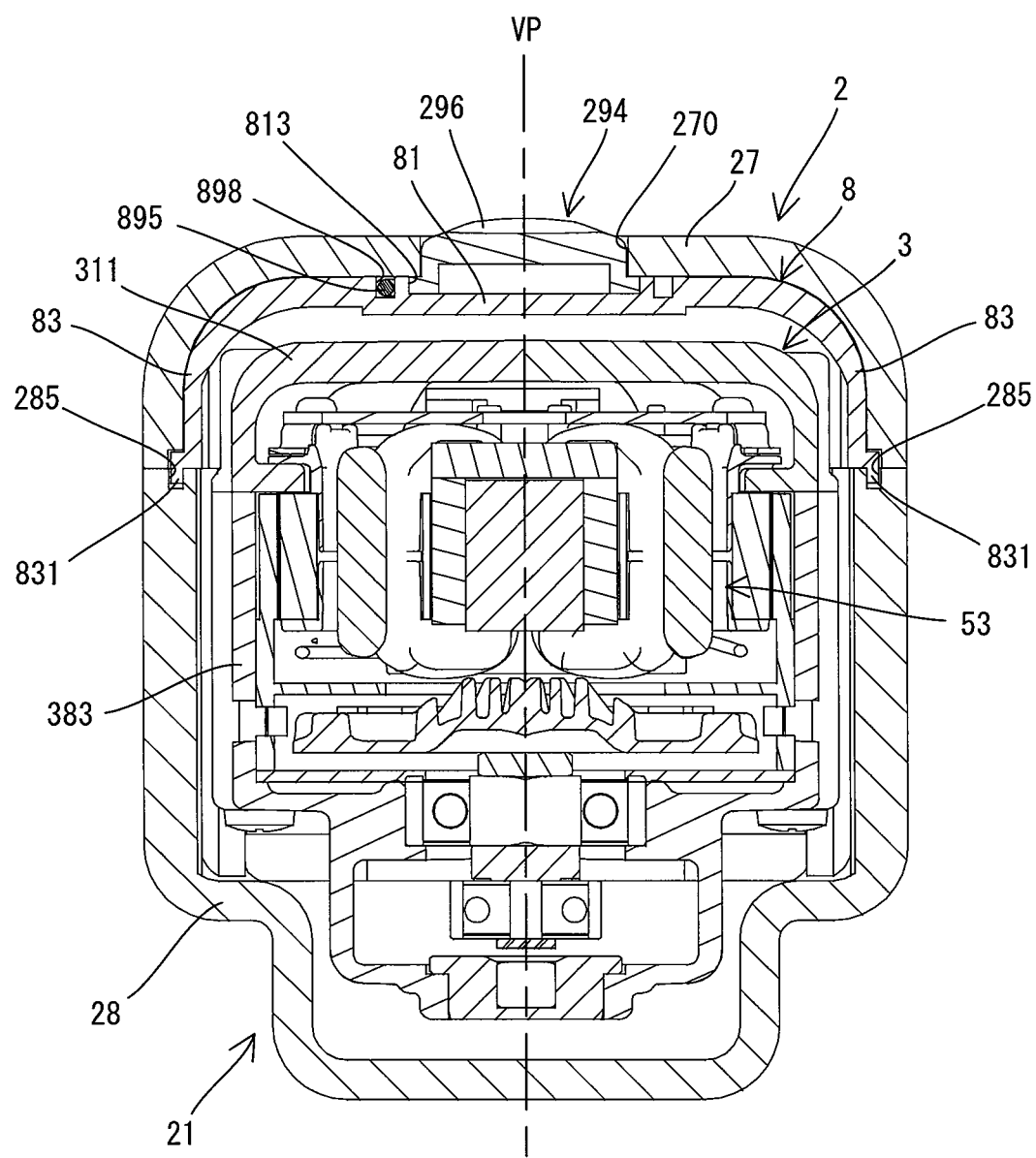
FIG. 19 is a sectional view taken along line XIX-XIX in FIG. 2.

The structure of the guide member 8 is now described. As shown in FIGS. 17 to 19, the guide member 8 is supported by the lower shell 28 and the switch holder 20 of the outer housing 2. Further, the guide member 8 is configured to hold the switching member 294 so as to be slidable in the front-rear direction and to guide a sliding movement of the switching member 294. In the present embodiment, the guide member 8 includes a slide-guide part 81 and support legs 83.

The slide-guide part 81 is configured to hold the switching member 294 so as to be slidable in the front-rear direction and guide the sliding movement of the switching member 294. More specifically, the slide-guide part 81 has an elongate shape extending in the front-rear direction and generally corresponding to the switching member 294. In other words, a front-end part 811 of the slide-guide part 81 has a larger width in the left-right direction than the remaining portion of the slide-guide part 81 which extends rearward from the front-end part 811. The slide-guide part 81 has a recess 813 formed on its upper surface and extending in the front-rear direction. The switching member 294 is disposed in the recess 813. A portion of the recess 813 which is formed in the front-end part 811 has generally the same width in the left-right direction as the front-end part 295 of the switching member 294 and has a longer length in the front-rear direction than the front-end part 295. Further, a portion of the recess 813 which extends rearward of the front-end part 811 has generally the same width in the left-right direction and generally the same length in the front-rear direction as the rear portion of the switching member 294 which extends rearward of the front-end part 295. Further, an opening 815 is formed in a rear end portion of the slide-guide part 81. A connection part between the rear end portion of the switching member 294 and the actuation part 291 of the switch 29 is disposed in the opening 815.

Four support legs 83 protrude from each of the left and right sides of the front-end part 811 of the slide guide 81. Each of the four left support legs 83 has a circular arc shape as viewed from the front, protruding leftward from the left side of the front-end part 811 and curving downward. Similarly, each of the four right support legs 83 has a circular arc shape as viewed from the front, protruding rightward from the right side of the front-end part 811 and curving downward in symmetry to the four left support legs 83. A locking projection 831 is formed on a lower end of each of the support legs 83. A locking hole 285 is formed in an upper end surface of a portion of the lower shell 28 which forms the front-end part 21. The locking hole 285 is a recess in which the locking projection 831 can be fitted. Four such locking holes 285 are provided correspondingly to the support legs 83 in each of left and right side walls of the lower shell 28.

In the present embodiment, the guide member 8 is supported by the lower shell 28 and the switch holder 20, via the support legs 83 and the rear end portion of the slide-guide part 81. Specifically, the locking projections 831 of the eight support legs 83 are fitted in the locking holes 285 of the lower shell 28. Further, the rear end portion of the slide guide 81 is placed on the switch holder 20. Although not shown, the rear end portion of the slide guide 81 has a projection protruding downward. This projection is fitted in a locking hole of the switch holder 20, so that the rear end portion of the slide guide 81 is locked to the switch holder 20.

In a process of assembling the oscillating tool 100, as shown in FIG. 18, the switch holder 20 is elastically connected to the rear-end part 33 of the inner housing 3 and the inner housing 3 is housed in the lower shell 28. Further, the guide member 8 holding the switching member 294 is supported by the lower shell 28, and thereafter the upper shell 27 is connected to the lower shell 28. As shown in FIG. 19, when the upper shell 27 is connected to the lower shell 28, each of the support legs 83 is disposed within the outer housing 2, extending along an inner surface of the upper shell 27 and apart from the inner housing 3.

As shown in FIG. 15, most of the switching member 294, except the operation part 296, is disposed between the slide-guide part 81 (the bottom of the recess 813) and the inner surface (a lower surface of an upper wall) of the upper shell 27 so as to be slidable in the front-rear direction. On the other hand, as shown in FIG. 19, the operation part 296 which is provided on the upper surface of the front-end part 295 is exposed to the outside through the opening 270 of the upper shell 27. As shown in FIG. 1, the opening 270 has generally the same width in the left-right direction as the operation part 296 and has a longer length in the front-rear direction than the operation part 296. Therefore, the operation part 296 is allowed to slide in the front-rear direction within the opening 270.

As described above, in the present embodiment, the switching member 294 is held slidably in the front-rear direction by the guide member 8, which is supported by the outer housing 2. When the switching member 294 is moved, right and left side surfaces of the recess 813 of the guide member 8 restrict a movement of the switching member 294 in the left-right direction. Further, the inner surface of the upper shell 27 and the bottom of the recess 813 restrict a movement of the switching member 294 in the up-down direction. In other words, the recess 813 serves as a slide guide, and the guide member 8 guides the sliding movement of the switching member 294 in the front-rear direction. When the user slides the operation part 296 forward from a rear initial position, the switching member 294 is slid forward. In response to this operation, the actuation part 291 of the switch 29 is moved from the OFF position to the ON position and the switch 29 is turned on, so that the motor 53 is driven. When the user slides the operation part 296 from the front position to the rear initial position, the switching member 294 is slid rearward. Thus, the actuation part 291 of the switch 29 is moved from the ON position to the OFF position and the switch 29 is turned off, so that the driving of the motor 53 is stopped.

Figure 20:
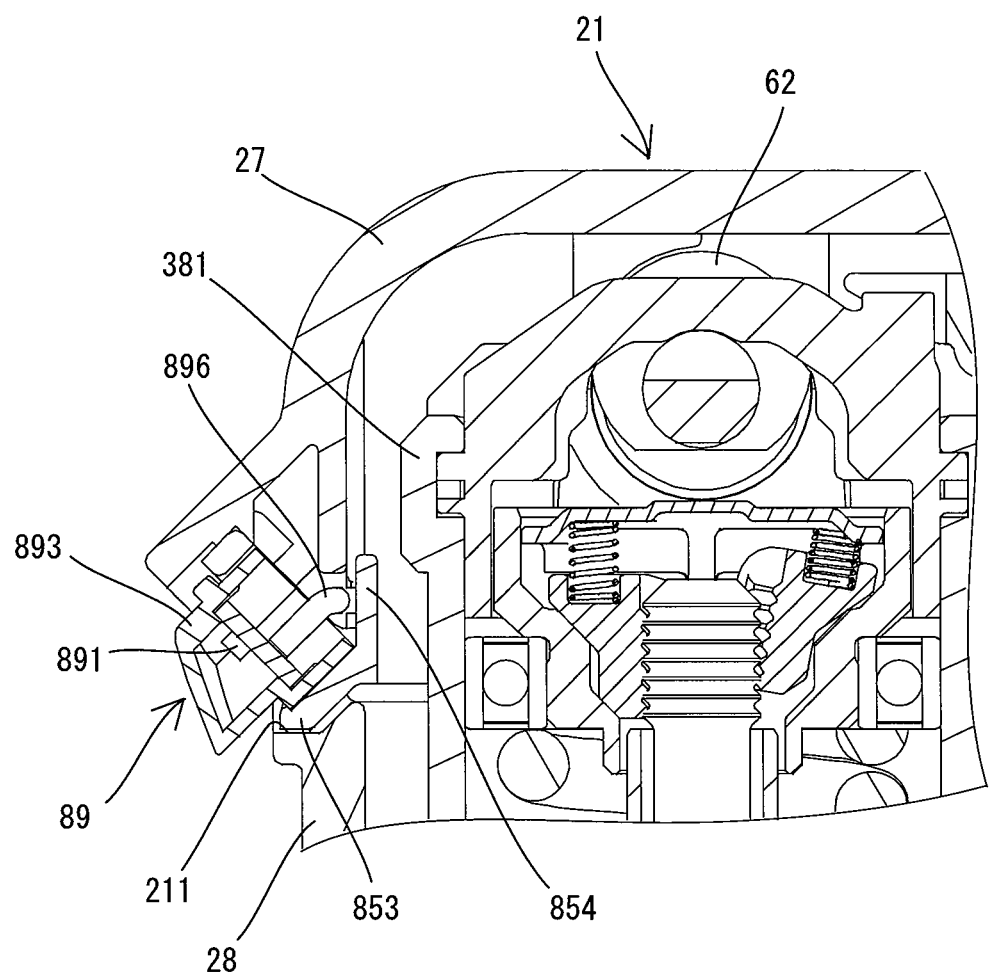
FIG. 20 is another partial, enlarged view of FIG. 2, showing an illumination unit and its peripheral region in a longitudinal section view.

Further, in the present embodiment, the guide member 8 is configured to hold the illumination unit 89 described below. Therefore, as shown in FIGS. 17 and 18, the guide member 8 has an illumination-unit-holding part 85 protruding forward from the front-end part 811 of the slide-guide part 81. The illumination-unit-holding part 85 includes a pair of arm parts 851 and a holding frame 853. Each of the arm parts 851 has a generally L-shape in a side view, extending forward from left and right ends of the front-end part 811 along the inner surface of the upper shell 27 and further extending downward while curving. The holding frame 853 is disposed to connect front ends of the arm parts 851. The illumination unit 89 is fitted and locked in the holding frame 853. As shown in FIG. 20, an opening 211 is formed in an upper portion of the front-end part 21 of the outer housing 2 (between a lower end of the upper shell 27 and an upper end of the lower shell 28). The holding frame 853 is held in the opening 211 when the upper shell 27 is connected to the lower shell 28 as described above.

As shown in FIG. 20, the illumination unit 89 mainly includes an LED substrate 891 and a case 893. A light emitting diode (LED) is mounted as a light source on the LED substrate 891. The case 893 is made of transparent material (transparent resin, glass or the like) and houses the LED substrate 891. The illumination unit 89 is mounted to the holding frame 853 so as to illuminate a working region of the tool accessory 91 (in other words, a region in front of the tool-mounting part 511). Specifically, the illumination unit 89 is disposed to illuminate obliquely downward to the front from the opening 211.

In the present embodiment, the guide member 8 is made of synthetic resin and configured to hold a wiring 895 for power supply to the illumination unit 89 (the LED substrate 891) and guide the wiring 895 to the illumination unit 89. In the oscillating tool 100, the battery 93, which is the power source, may be mounted to the rear end portion (specifically, the battery-mounting part 331 of the inner housing 3) of the oscillating tool 100, while, as described above, the illumination unit 89 for illuminating the working region of the tool accessory 91 is disposed in the front end portion (specifically, the front-end part 21 of the outer housing part 2) of the oscillating tool 100. Therefore, the wiring 895 extends from the rear end portion to the front end portion of the oscillating tool 100 via the elongate grip part 25. Therefore, in the present embodiment, the guide member 8 for the switching member 294 of the switch 29, which extends within the grip part 25, is also utilized as a guide member for the wiring 895.

More specifically, as shown in FIG. 18, a guide groove 898 is formed in an upper surface of the guide member 8 and extends from the rear end portion to the front end portion of the guide member 8. The guide groove 898 extends forward from a right rear end of the slide-guide part 81 along a right edge of the slide-guide part 81, and further extends along the right arm part 851 of the illumination-unit-holding part 85 up to the front end of the arm part 851. The guide groove 898 has a larger sectional area than the wiring 895.

Figure 21:
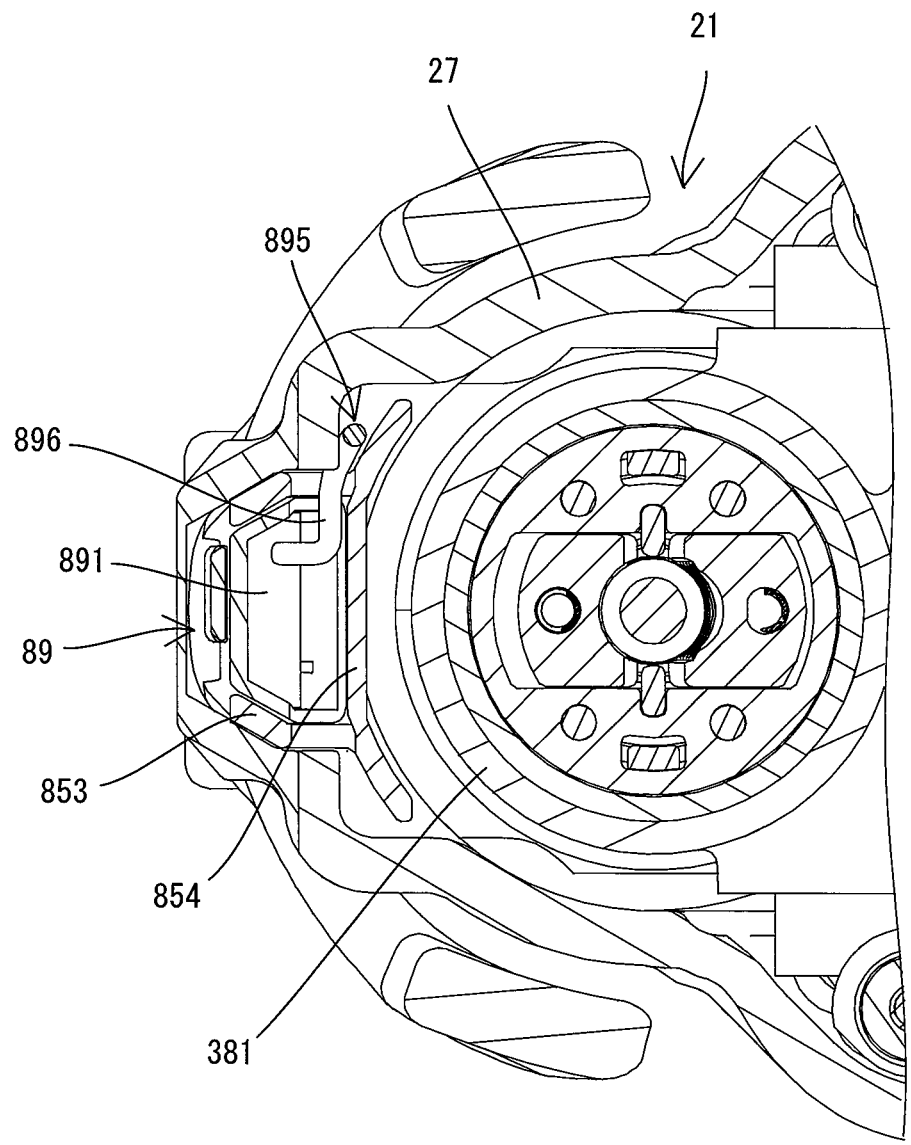
FIG. 21 is a cross sectional view showing the illumination unit and its peripheral region.
Figure 22:
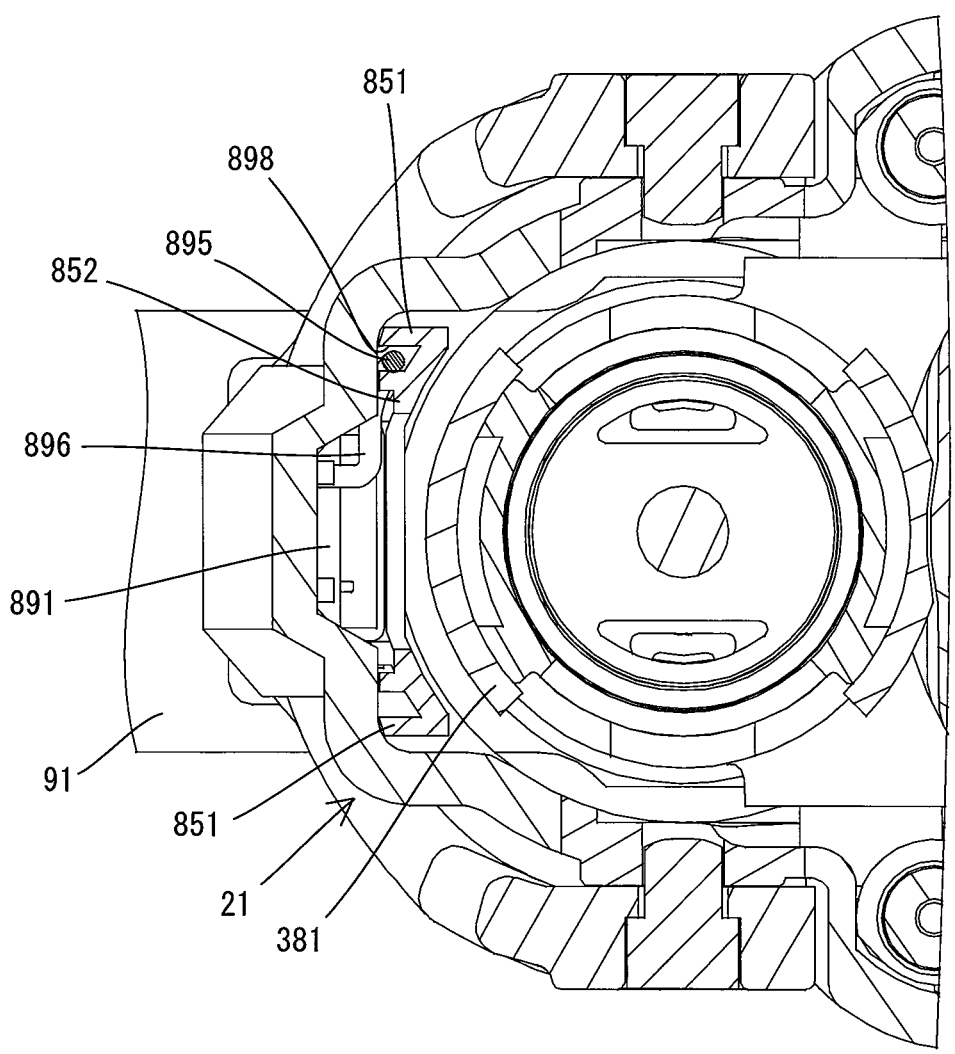
FIG. 22 is a partial, enlarged view of FIG. 4, showing the illumination unit and its peripheral region in a different cross sectional view.

In the present embodiment, as shown in FIG. 9, one end of the wiring 895 is connected to the control unit 4, to which power is supplied from the battery 93 via the battery-mounting part 331. The wiring 895 extends forward from the control unit 4 below the switch holder 20 and is bent upward in front of the switch holder 20 and extends up to the rear end of the guide groove 898. Then, as shown in FIG. 18, the wiring 895 is fitted in the guide groove 898 and extends forward along the guide groove 898. Then, as shown in FIGS. 20 to 22, the wiring 895 extends out of the guide groove 898 at the front end of the arm part 851 of the illumination-unit-holding part 85 and is connected to the LED substrate 891. Further, as shown in FIGS. 8, 14, 15, 19 and 22, in the present embodiment, the guide member 8 is disposed along the inner surface of the upper shell 27 as described above. Therefore, the guide groove 898 is substantially covered from above by the upper shell 27. In this manner, the wiring 895 extends from the rear end portion to the front end portion of the guide member 8, within a housing space which is defined by the guide groove 898 and the inner surface of the upper shell 27.

Further, in the oscillating tool 100 of the present embodiment, certain portions of metal members are exposed to the outside of the outer housing 2. Specifically, the spindle-housing part 381 and the screws 623 for connecting the operation lever 61 to the rotary shaft 62 are the metal members which are at least partially exposed to the outside. Therefore, in the present embodiment, the outer housing 2 and the guide member 8 are configured to secure a creepage distance for insulation between the wiring 895 in the guide groove 898 and the spindle-housing part 381 and the rotary shaft 62, in order to provide protective insulation between the wiring 895 and the spindle-housing part 381, and between the wiring 895 and the rotary shaft 62.

For example, as shown in FIG. 22, in a portion of the arm part 851 which extends downward in front of the spindle-housing part 381, the distance between a left end of an opening end of the guide groove 898 and the spindle-housing part 381 is relatively short. Therefore, as shown in FIGS. 22 and 17, a rib 852 is provided to protrude leftward, in this portion of the arm part 851. Thus, the creepage distance between the wiring 895 in the guide groove 898 and the spindle-housing part 381 is made longer than a structure not having the rib 852. In the present embodiment, a sufficient creepage distance is secured by thus providing the rib 852 on the arm part 851.

Further, as shown in FIGS. 20 and 21, a front-end part 896 of the wiring 895 which extends from the front end of the arm part 851 to the LED substrate 891 is not disposed in the guide groove 898. Furthermore, the distance between the front-end part 896 and the spindle-housing part 381 is relatively short. Therefore, the holding frame 853 has a partition 854 which is interposed between the front-end part 896 of the wiring 895 and the spindle-housing part 381 and protrudes upward of the front-end part 896. In the present embodiment, a sufficient creepage distance is secured between the front-end part 896 and the spindle-housing part 381 by thus extending the partition 854 upward.

Further, as shown in FIG. 8, in a central portion of the arm part 851, the distance between a left end of an opening end of the guide groove 898 and the eccentric part 621 of the rotary shaft 62 is relatively short. Therefore, a first rib 275 and a second rib 276 are provided on the inner surface of the upper shell 27. The first rib 275 protrudes downward to face the guide groove 898 and the second rib 276 protrudes downward between the arm part 851 and the eccentric part 621. The protruding length of the first rib 275 is set such that the first rib 275 comes in contact with the wiring 895 in the guide groove 898, and the protruding length of the second rib 276 is set to be substantially equal to the up-down height of the arm part 851. It can also be said that the first and second ribs 275, 276 form a labyrinth structure (a recess-and-protrusion structure) together with the guide groove 898 of the arm part 851. In the present embodiment, a sufficient creepage distance is secured between the wiring 895 and the rotary shaft 62 by providing such a labyrinth structure.

Operation of the oscillating tool 100 is now described. The user attaches the tool accessory 91 for a desired processing operation to the tool-mounting part 511, holds the grip part 25 and slides the operation part 296 to turn on the switch 29. The control unit 4 (specifically, the CPU) then starts driving of the motor 53 when the switch 29 is turned on. The control unit 4 sets the rotation speed of the motor 53 based on a resistance value outputted from the speed-change dial unit 26. When the motor 53 is driven, the spindle 51 is reciprocally rotated around the axis A1 within the specified angle range, and thereby oscillates the tool accessory 91 (generally in the left-right direction in the case of the blade shown in the drawings) in the oscillation plane OP. The oscillating tool 100 performs the processing operation with the tool accessory 91 pressed against a workpiece by the user.

As described above, the oscillating tool 100 of the present embodiment is configured to oscillatory drive the tool accessory 91 mounted to the spindle 51. In the oscillating tool 100, when the tool accessory 91 is oscillatory driven, relatively large vibration is likely to be caused in the front-end part 31 of the inner housing 3 which houses the driving mechanism 5. In order to cope with this, in the present embodiment, the outer housing 2 and the front-end part 31 of the inner housing 3 are connected with each other via the front elastic members 71, so as to be movable relative to each other. Furthermore, the outer housing 2 (the switch holder 20) and the rear-end part 33 of the inner housing 3 are also connected with each other via the rear elastic members 76, so as to be movable relative to each other. Therefore, transmission of the vibration from the inner housing 3 to the outer housing 2 can be effectively suppressed.

Further, the spindle 51 to which the tool accessory 91 may be mounted is supported by the front-end part 31 of the inner housing 3. In relation to this arrangement, the inner housing 3 (specifically, the portion of the inner housing 3 which includes the front-end part 31 and the extending part 35) is provided with the weight 300 to increase its inertia moment around the axis A1 of the spindle 51. Consequently, the inner housing 3 is made less likely to oscillate around the axis A1 even when a certain load is applied to the tool accessory 91. With such a structure, during the operation, an unnecessary movement of the inner housing 30 relative to the outer housing 2 can be suppressed, so that a decrease in working efficiency of the tool accessory 91 can be suppressed. Further, the vibration itself caused in the inner housing 3 can be reduced by increasing the inertia moment of the inner housing 3 by the weight 300.

In the present embodiment, the portion of the inner housing 3 is made of synthetic resin, which is preferable in terms of reduction in weight and manufacturing costs of the whole oscillating tool 100, but which is likely to cause a decrease in the inertia moment of the inner housing 3. In order to cope with this, the inertia moment of the inner housing 3 can be increased with a simple structure that the metal weight 300 having a higher density than the synthetic resin is provided to the inner housing 3. Particularly, in the present embodiment, the weight 300 is disposed in the rear end portion of the extending part 35, which is integrally formed with the front-end part 31 and extends rearward from the front-end part 31 within the grip part 25. In other words, the weight 300 is disposed at a position relatively distant from the axis A1. With this structure, the inertia moment of the inner housing 3 (particularly, the portion including the front-end part 31 and the extending part 35) can be effectively increased.

In the present embodiment, the inertia moment M1 is set to be at least 25 times of the inertia moment M2. The inertia moment M1 is the inertia moment of the portion of the inner housing 3 which includes the front-end part 31 and the extending part 35, around the axis A1, with the driving mechanism 5 housed therein and the weight 300 mounted thereto, while the inertia moment M2 is the inertia moment of the tool accessory 91 around the axis A1, the tool accessory 91 having the largest mass among the tool accessories 91 which can be mounted to the oscillating tool 100. With this structure, the portion of the inner housing 3 which includes the front-end part 31 and the extending part 35 can be made much harder to rotate around the axis A1 than the tool accessory 91. Thus, the inertia moment of the inner housing 3 can be optimized in relation with the tool accessory 91. Furthermore, the inertia moment M1 is set to be not more than 35 times of the inertia moment M2 of the tool accessory 91. Therefore, the mass of the whole oscillating tool 100 can be set within a range in which the operability is not impaired while the inertia moment of the inner housing 3 is optimized.

In the present embodiment, the weight 300 is fixed to the extending part 35 in a stet in which the weight 300 is held between the left shell 391 and the right shell 392. With this structure, the weight 300 can be easily and reliably fixed to the extending part 35 in the process of assembling the extending part 35.

Further, in the present embodiment, the spindle 97 and the motor 53 are supported by the front-end part 31 such that their respective axes A1, A2 extend in parallel to each other. With this structure, the oscillating tool 100 can be reduced in size. Further, the weight 300 can appropriately compensate for the reduction in the inertia moment which might otherwise be caused due to the structure that relatively heavy members of the oscillating tool 100 such as the motor 53, the spindle 51 and the transmitting mechanism 55 are all disposed in the front-end part 31.

Further, in the inner housing 3 of the present embodiment, the rear-end part 33 having the battery-mounting part 331 is movably connected to the front-end part 31 and the extending part 35 which are immovably integrated with each other, via the four elastic ribs 371 spaced apart from each other in the circumferential direction. In the present embodiment, the spindle 51 is disposed in the front-end part 31 of the inner housing 3, while the battery-mounting part 331 for enabling power supply from the battery 93 to the motor 53 is provided in the rear-end part 33. In this case, by mounting the battery 93 having a relatively large mass to the battery-mounting part 331, the inertia moment of the inner housing 3 can further be increased. The elastic ribs 371 which connect the extending part 35 and the rear-end part 33 can suppress transmission of the vibration from the front-end part 31 to the rear-end part 33 and thereby protect the battery-mounting part 331. Further, the weight 300 can be effectively disposed by utilizing the internal space 370 surrounded by the elastic ribs 371.

Second Embodiment

An oscillating tool 101 according to a second embodiment is now described with reference to FIG. 23. Like the oscillating tool 100 of the first embodiment, the oscillating tool 101 of the present embodiment is also configured to reciprocally rotate the spindle 51 within a specified angle range around the axis A1 by power of the motor 53 configured as a brushless DC motor. The power source of the oscillating tool 101 is, however, an external AC power source (commercial power supply), in place of the battery 93 mounted to the battery-mounting part 331. Therefore, a rear-end part 330 of an inner housing 30 of the oscillating tool 101 and its internal configuration are different from the rear-end part 33 and its internal configuration of the first embodiment. The other structures of the oscillating tool 101 are otherwise substantially identical to those of the oscillating tool 100 of the first embodiment. Therefore, the structures which are substantially identical to those in the first embodiment are given the same numerals as in the first embodiment and are not described or shown or only briefly described or shown here, and the different structures are mainly described below.

Figure 23:
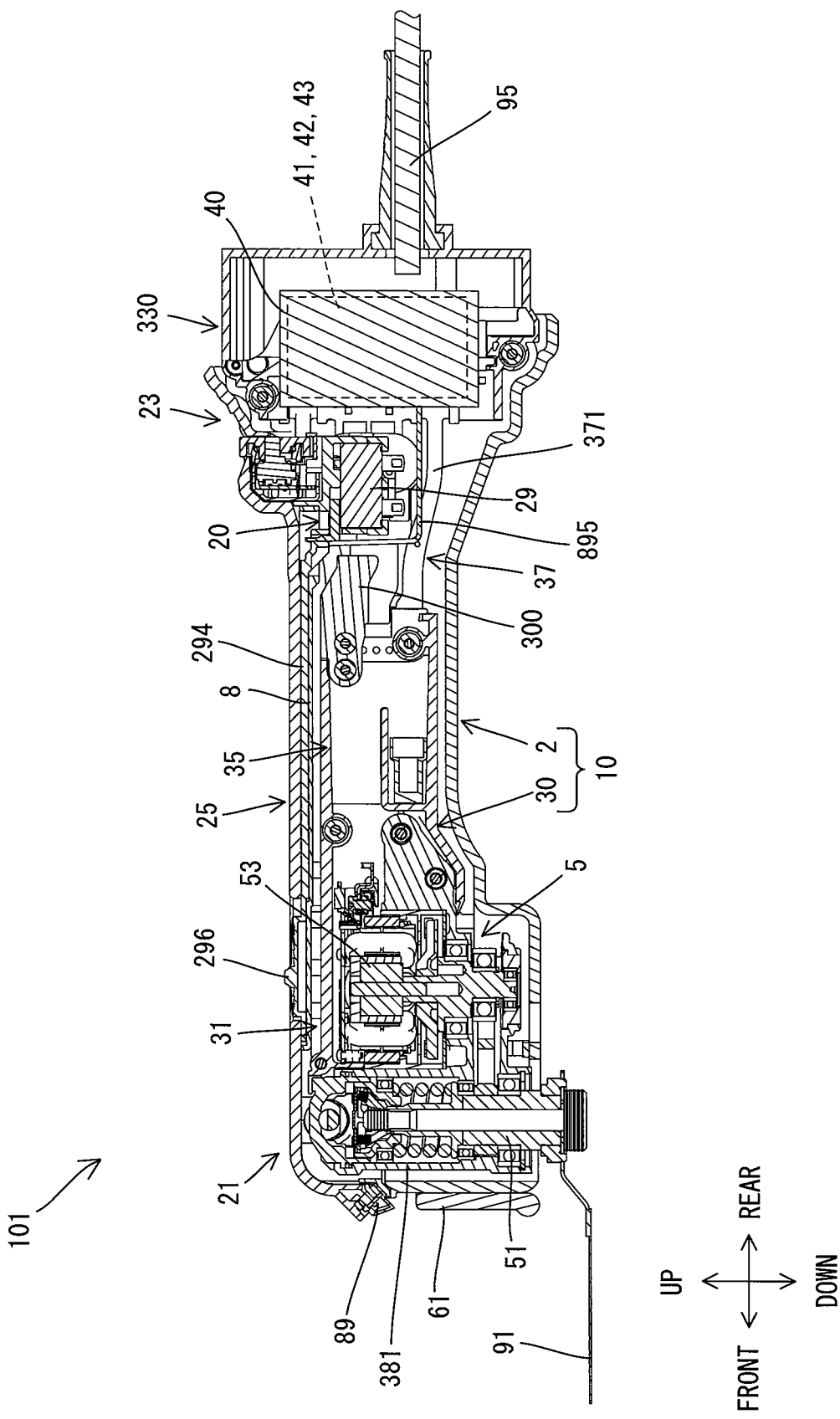
FIG. 23 is a longitudinal section view of an oscillating tool according to a second embodiment.

As shown in FIG. 23, the oscillating tool 101 has a housing 10 configured as a so-called vibration-isolating housing, like the housing 1 of the oscillating tool 100. The housing 10 includes an elongate outer housing 2 and an elongate inner housing 30 housed in the outer housing 2. The inner housing 30 includes a front-end part 31, an extending part 35, an elastic connection part 37 (four elastic ribs 371) and the rear-end part 330.

In the above-described first embodiment, the battery-mounting part 331 (see FIG. 2) is provided in the rear-end part 33, as a power-source-related device for enabling power supply from the battery 93 to the motor 53. On the other hand, in the present embodiment, a power-source-related device is provided in the rear-end part 330 to enable power supply from the external AC power source to the motor 53. Specifically, as shown in FIG. 23, a power cable 95 which is connectable to the AC power source extends from a rear end of the rear-end part 330. Further, an AC-DC converter 41 which is configured to convert alternating current into direct current is disposed within the rear-end part 330 and connected to the power cable 95.

In the present embodiment, the AC-DC converter 41 forms a control unit 40 together with a three-phase inverter 42 and a CPU 43. The three-phase inverter 42 is configured to convert direct current into alternating current and drive the motor 53 by using switching elements. The CPU 43 is configured to control driving of the motor 53 via the three-phase inverter 42. The AC-DC converter 41 is the heaviest among these components of the control unit 40. It is noted that the weight of the AC-DC converter 41 in the present embodiment is generally equal to the weight of the battery 93 of the first embodiment. It is also noted that at least one of the three-phase inverter 42 and the CPU 43 may be disposed not within the rear-end part 330, but in the vicinity of the motor 53.

In the present embodiment, the spindle 51, the motor 53 and the transmitting mechanism 55, which are heavy members of the oscillating tool 101, are all disposed in the front-end part 31, while the correspondingly relatively heavy AC-DC converter 41 is disposed in the rear-end part 33. Further, in the present embodiment, in addition to the AC-DC converter 41, the three-phase inverter 42 and the CPU 43 are disposed within the rear-end part 330, so that the weight of the internal components of the rear-end part 330 is further increased. The inertia moment of the inner housing 30 can be thus increased by such a structure, as in the case of the battery 93 mounted to the rear-end part 33. Therefore, even when a certain load is applied to the tool accessory 91, an unnecessary rotation of the inner housing 30 around the axis A1 relative to the outer housing 2 can be suppressed. Further, vibration itself caused in the inner housing 30 can be reduced by the increase of the inertia moment. The other effects of the oscillating tool 100 of the first embodiment can also be obtained with the same structures as the oscillating tool 100.

Correspondences between the features of the above-described embodiments and the features of the invention are as follows. The oscillating tool 100, 101 is an example that corresponds to the "power tool". The motor 35 is an example that corresponds to the "motor" and the "brushless motor". The output shaft 531 is an example that corresponds to the "output shaft". The axis A2 is an example that corresponds to the "first axis". The spindle 51 is an example that corresponds to the "spindle". The axis A1 is an example that corresponds to the "second axis". The transmitting mechanism 55 is an example that corresponds to the "transmitting mechanism". The inner housing 3, 30 is an example that corresponds to the "support body". The outer housing 2 is an example that corresponds to the "housing". The front-end part 31 is an example that corresponds to the "first end part". The front elastic member 71 is an example that corresponds to the "first elastic member" and the "elastic member". The weight 300 is an example that corresponds to the "weight".

The grip part 25 is an example that corresponds to the "grip part". The extending part 35 is an example that corresponds to the "extending part". The rear end portion of the extending part 35 is an example that corresponds to the "weight-mounting part" 400. The left shell 391 and the right shell 392 are examples that correspond to the "left part" and the "right part", respectively. The rear-end part 33, 330 is an example that corresponds to the "second end part". The elastic rib 371 is an example that corresponds to the "second elastic member". The battery-mounting part 331 is an example that corresponds to the "power-source-related device". The power cable 95 and the AC-DC converter 41 are examples that correspond to the "power-source-related device".

The above-described embodiments are mere examples, and a power tool according to the present invention is not limited to the structures of the oscillating tools 100, 101 of the above-described embodiments. For example, the following modifications may be made. Further, one or more of these modifications may be employed in combination with any one of the oscillating tools 100, 101 of the above-described embodiments and the claimed inventions.

The number, size, shape, material and arrangement position of the weight 300 in the inner housing 3, 30 may be appropriately changed. For example, a plurality of weights 300 may be provided. In this case, the weights 300 may have different sizes and shapes. The weight 300 need not be held between the left shell 391 and the right shell 392 and fixed to the extending part 35, but it may be fixed to the outer surface of the extending part 35 or integrally formed with the extending part 35. Alternatively, the extending part 35 itself may be made of a material (a metal material such as aluminum) having a higher density than the synthetic resin and formed as a weight. The weight 300 need not be disposed in the rear end portion of the extending part 35. It may be preferable, however, that the weight 300 is disposed at a position relatively distant from the axis A1 of the spindle 51 in a portion of the inner housing 3, 30 which houses the driving mechanism 5 and which can be regarded as a single rigid body.

The structure of the inner housing 3, 30 may be appropriately changed. For example, the inner housing 3 need not house the driving mechanism 5 and other internal mechanisms in such a manner as to cover them, but it may simply support the driving mechanism 5 and other internal mechanisms, at least partly. The structure and arrangement of the driving mechanism 5 (the motor 53, the spindle 51 and the transmitting mechanism 55) may be appropriately changed. For example, the motor 53 may be disposed such that the axis A2 of the output shaft 531 is orthogonal to the axis A1 of the spindle 51. Further, the motor 53 may be a motor with a brush and not a brushless motor.

The shapes of the metal housing 38 and the plastic housing 39 may be appropriately changed, and the inner housing 3, 30 may be made of a single material. Further, the rear-end part 33, 330 of the inner housing 3, 30 need not be connected to the front-end part 31 via the elastic connection part 37. In a structure having the elastic connection part 37, the number, shape and circumferential arrangement positions of the elastic ribs 371 may be appropriately changed. For example, any desired number (two, three, five or more) of the elastic ribs 371 may be provided. Note that, when the inner housing 3, 30 includes a plurality of divided component parts in the left-right direction, such as the left shell 391 and the right shell 392, it may be preferable to provide two or more elastic ribs 371 on each of the component parts.

Further, in the above-described embodiments, the elastic rib 371 is formed in a band-like shape so as to be imparted with flexibility, and made of synthetic resin having a lower elastic modulus than the other parts. Such a structure formed by integrally molding the elastic ribs 371 with the front-end part 31, the extending part 35 and the rear-end part 33, 330 may be preferable in terms of ease of assembly and manufacturing costs. However, the extending part 35 and the rear-end part 33, 330 may be elastically connected, for example, via a rubber element or a spring element formed as a separate member. Further, the elastic ribs 371 may be made of the same material as the front-end part 31, the extending part 35 and the rear-end part 33, 330, provided that the elastic ribs 371 are configured to have elasticity (for example, shaped to be easily elastically deformable like in the above-described embodiments). Further, the elastic ribs 371 need not be shaped to be more easily elastically deformable than the other parts like in the above-described embodiments, provided that the elastic ribs 371 are at least partially made of a material having a lower elastic modulus.

Like the elastic ribs 371, the front elastic members 71 and the rear elastic members 76 may be appropriately changed in number, shape and circumferential arrangement positions within a range in which the outer housing 2 and the inner housing 3, 30 can be elastically connected so as to be movable in all directions (the front-rear, left-right and up-down directions) relative to each other. In the first embodiment, it may be preferable to connect the rear-end part 33 to the outer housing 2 via the rear elastic members 76 in order to stabilize the positional relation between the battery 93 and the outer housing 2, but the rear elastic members 76 need not be provided. Also in the second embodiment, the rear elastic members 76 may be omitted.

Further, in view of the nature of the present invention, the above-described embodiments and modifications thereto, the following features may be provided. Each of the features can be employed in combination with any one of the oscillating tools 100, 101 of the above-described embodiments, the above-described modifications and the claimed inventions.

(Aspect 1)

The extending part may be made of plastic and the weight may be made of metal.

(Aspect 2)

The power tool as defined in claim 7 may be configured such that:

the housing includes a grip part configured to be held by a user, the support body includes an extending part which is integrally formed with the first end part, and extends from the first end part in the direction of the longitudinal axis, corresponding to at least a portion of the grip part, the power tool further includes a weight which is provided to an end portion of the extending part, the end portion being on an opposite side to the first end part in the direction of the longitudinal axis, and the inertia moment of the first end part and the extending part of the support body including the weight is at least 20 times of the inertia moment of the tool accessory.

(Aspect 3)

The power-source-related device may comprise a battery-mounting part configured such that a battery serving as the power source is removably mounted thereto.

(Aspect 4)

The power-source-related device may include:

a cable connectable to an external alternate current power source serving as the power source; and a converter connected to the cable and configured to convert alternating current into direct current.

(Aspect 5)

The power tool may further include a third elastic member interposed between the housing and the second end part of the support body and connecting the housing and the second end part so as to be movable relative to each other.

DESCRIPTION OF THE NUMERALS

100, 101: oscillating tool, 1, 10: housing, 2: outer housing, 21: front-end part, 211: opening, 23: rear-end part, 25: central part (grip part), 26: speed change dial unit, 261: dial, 27: upper shell, 270: opening, 271: cylindrical part, 273: cylindrical part, 275: first rib, 276: second rib, 28: lower shell, 281: through hole, 283: cylindrical part, 285: locking hole, 29: switch, 291: actuation part, 294: switching member, 295: front-end part, 296: operation part, 20: switch holder, 202: body, 203: recess, 206: cylindrical part, 207: screw, 3, 30: inner housing, 31: front-end part, 311: motor-cover part, 33, 330: rear-end part, 331: battery-mounting part, 332: control-unit-housing part, 334: arm part, 335: projection, 35: extending part, 37: elastic connection part, 370: internal space, 371: elastic rib, 38: metal housing, 381: spindle-housing part, 382: recess, 383: motor-housing part, 387: contact part, 39: plastic housing, 391: left shell, 392: right shell, 393: cylindrical part, 394: cylindrical part, 300:

weight, 301: front part, 302: rear part, 304: through hole, 308: screw, 4, 40: control unit, 41: AC-DC converter, 42: three-phase inverter, 43: CPU, 5: driving mechanism, 51: spindle, 511: tool-mounting part, 52: clamp shaft, 521: clamp head, 523: groove part, 53: motor, 530: motor body, 531: output shaft, 55: transmitting mechanism, 551: eccentric shaft, 553: oscillating arm, 555: drive bearing, 6: lock mechanism, 61: operation lever, 62: rotary shaft, 621: eccentric part, 623: screw, 63: compression coil spring, 65: collar, 67: clamp member, 671: ridge part, 71: front elastic member, 711: through hole, 72: connecting member, 721: cylindrical part, 722: projection, 724: cylindrical part, 725: base part, 726: screw, 76: rear elastic member, 761: through hole, 8: guide member, 81: slide-guide part, 811: front-end part, 813: recess, 815: opening, 83: support leg, 831: locking projection, 85: illumination-unit-holding part, 851: arm part, 852: rib, 853: holding frame, 854: partition, 89: illumination unit, 891: LED substrate, 893: case, 895: wiring, 896: front-end part, 898: guide groove, 91: tool accessory, 93: battery, 95: power cable, A1: axis, A2: axis, OP: oscillation plane, VP: vertical plane

What is claimed is:

1. A power tool configured to oscillatory drive a tool accessory, the power tool comprising:
a motor having a stator and an output shaft, the output shaft being rotatable around a first axis;
a spindle configured to removably receive the tool accessory and rotatably supported around a second axis;
a transmitting mechanism configured to transmit rotation of the output shaft to the spindle and reciprocally rotate the spindle within a specified angle range around the second axis;
an elongate support body having a longitudinal axis and supporting the spindle, supporting the transmitting mechanism and fixedly supporting the stator;
an elongate housing that houses the support body; and
a first elastic member interposed between the housing and a first end part of the support body and connecting the housing and the support body so as to be movable relative to each other, the first end part forming an end part of the support body in a direction of the longitudinal axis, wherein:
the spindle is supported in the first end part such that the second axis crosses the direction of the longitudinal axis, and
the support body has a weight fixedly supported by the support body to increase an inertia moment of the support body around the second axis.

2. The power tool as defined in claim 1, wherein:
the support body includes a weight-mounting part to which the weight is mounted, and
the weight is made of a material having a higher density than at least the weight-mounting part.

3. The power tool as defined in claim 1, wherein:
the housing includes a grip part configured to be held by a user,
the support body includes an extending part integrally formed with the first end part, the extending part extending from the first end part in the direction of the longitudinal axis, corresponding to at least a portion of the grip part, and
the weight is provided to the extending part.

4. The power tool as defined in claim 3, wherein:
the second axis is orthogonal to the direction of the longitudinal axis of the support body,
when an extending direction of the second axis is defined as an up-down direction, the direction of the longitudinal axis of the support body is defined as a front-rear direction, and a direction orthogonal to the front-rear direction and the up-down direction is defined as a left-right direction, at least the extending part includes a left part and a right part connected together to form the extending part, and
the weight is fixed to the extending part in a state in which the weight is held between the left part and the right part.

5. The power tool as defined in claim 3, wherein:
the support body includes:
a second end part forming another end part on an opposite side to the first end part in the direction of the longitudinal axis; and
a plurality of second elastic members spaced apart from each other in a circumferential direction around the longitudinal axis, the plurality of second elastic members connecting the extending part and the second end part so as to be movable relative to each other,
the second end part has a power-source-related device, the power-source-related device being configured to enable power supply from a power source to the motor, and
at least a portion of the weight is disposed within an internal space surrounded by the plurality of second elastic members.

6. The power tool as defined in claim 3, wherein:
the weight is at least partially disposed in the grip part.

7. The power tool as defined in claim 1, wherein:
the first axis and the second axis extend in parallel to each other, and
the motor and the transmitting mechanism are supported by the first end part.

8. The power tool as defined in claim 7, wherein:
the output shaft of the motor is between the spindle and the weight in the direction of the longitudinal axis.

9. The power tool as defined in claim 8, wherein:
a distance in the direction of the longitudinal axis between the weight and the output shaft is greater than a distance between the spindle and the output shaft.

10. The power tool as defined in claim 1, wherein:
an inertia moment of the support body around the second axis is at least 20 times of an inertia moment of a tool accessory around the second axis, when the tool accessory having a largest mass among the plural kinds of the tool accessories is mounted to the spindle.

11. The power tool as defined in claim 10, wherein the inertia moment of the support body around the second axis is not less than 25 times and not more than 35 times of the inertia moment of the tool accessory around the second axis.

12. The power tool as defined in claim 1, wherein:
the motor is between the mass and the transmitting mechanism.

* * * * *